(12) United States Patent
Sakurai et al.

(10) Patent No.: US 7,353,118 B2
(45) Date of Patent: *Apr. 1, 2008

(54) SYSTEM AND METHOD FOR PROVIDING ENVIRONMENTAL IMPACT INFORMATION, RECORDING MEDIUM RECORDING THE INFORMATION, AND COMPUTER DATA SIGNAL

(75) Inventors: Masamitsu Sakurai, Kanagawa (JP); Tatsuo Tani, Chiba (JP); Hiroshi Uramoto, Kanagawa (JP); Hiromitsu Hatano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/515,916

(22) Filed: Sep. 6, 2006

(65) Prior Publication Data

US 2007/0005265 A1    Jan. 4, 2007

Related U.S. Application Data

(63) Continuation of application No. 10/703,526, filed on Nov. 10, 2003, now Pat. No. 7,117,117.

(51) Int. Cl.
*G01N 31/00* (2006.01)

(52) U.S. Cl. .......................... 702/22; 702/30

(58) Field of Classification Search ............... 702/30, 702/1, 22; 700/106; 707/104.1; 703/10
See application file for complete search history.

(56) References Cited

U.S. PATENT DOCUMENTS

| | | | |
|---|---|---|---|
| 5,311,437 A | 5/1994 | Leal et al. | |
| 5,311,438 A | 5/1994 | Sellers et al. | |
| 5,646,863 A | 7/1997 | Morton | |
| 5,652,708 A | 7/1997 | Miyamoto et al. | |
| 5,664,112 A | 9/1997 | Sturgeon et al. | |
| 5,768,129 A | 6/1998 | Miyamoto | |
| 5,808,916 A | 9/1998 | Orr et al. | |
| 5,852,560 A | 12/1998 | Takeyama et al. | |
| 6,490,569 B1 | 12/2002 | Grune et al. | |
| 6,532,464 B1 | 3/2003 | Miyamoto | |
| 6,681,188 B2 | 1/2004 | Sakurai et al. | |
| 6,701,257 B2 | 3/2004 | Sakurai et al. | |
| 6,816,792 B2 | 11/2004 | Sakurai et al. | |

(Continued)

FOREIGN PATENT DOCUMENTS

EP    0921483    6/1999

(Continued)

OTHER PUBLICATIONS

Office Action issued on Mar. 4, 2005, for Chinese Patent Application No. 02156302.0 filed on Sep. 21, 2001, 8 pages.

(Continued)

*Primary Examiner*—John Barlow
*Assistant Examiner*—Xiuqin Sun
(74) *Attorney, Agent, or Firm*—Morrison & Foerster LLP

(57) ABSTRACT

An environmental impact information collection system modifies and analyzes environmental impact information, which is collected and stored in advance, and obtains the environmental impact at each process done in an organization, according to each product. The environmental impact information collection system then obtains a set of environmental impacts in a product's life cycle.

19 Claims, 19 Drawing Sheets

U.S. PATENT DOCUMENTS

| | | | |
|---|---|---|---|
| 6,829,743 B1 | 12/2004 | Hongu et al. | |
| 6,965,833 B2 | 11/2005 | Sakurai et al. | |
| 6,980,940 B1 * | 12/2005 | Gurpinar et al. | 703/10 |
| 2002/0035550 A1 | 3/2002 | Sakurai et al. | |
| 2003/0004965 A1 | 1/2003 | Farmer et al. | |

FOREIGN PATENT DOCUMENTS

| | | |
|---|---|---|
| EP | 0969397 | 1/2000 |
| EP | 1056028 | 11/2000 |
| EP | 1113375 | 7/2001 |
| JP | 05-155727 | 6/1993 |
| JP | 07-129659 | 5/1995 |
| JP | 10-057936 | 3/1998 |
| JP | 2000-189937 | 7/2000 |
| WO | WO-98-11493 | 3/1998 |
| WO | WO-00-41114 | 7/2000 |

OTHER PUBLICATIONS

Japanese Office Action, mailed on Oct. 2, 2007, directed to counterpart Japanese Application No. 2000-287772. 3 pages.

Komuro, Masamitsu. Aug. 20, 2000."Introduction to Visual Accounting: Comprehensible Environmental Accounting." *Visual Accounting*, First Ed., Nippon Jitsugyo Publishing, Co., Ltd., Japan, 119-160.

* cited by examiner

FIG. 5A

| ITEM | | | |
|---|---|---|---|
| ISO SYMBOL | | >ABS FR(10+17)< | |
| UL REGISTRATION MANUFACTURER | | ** CO LTD | |
| UL FILE NO. | | E54297 | |
| ...... | ...... | ...... | ...... |

| ITEM | UNIT | | TEST STANDARD | CONDITION |
|---|---|---|---|---|
| GLASS CONTENT | % | | — | — |
| WEIGHT | g/cm3 | 1.19 | ASTM D792 | 23°C |
| STRETCH STRENGTH | MPa | 44.1 | ASTM D638 | 23°C |
| STRETCH | % | 75.5 | ASTM D638 | 23°C |
| BENDING STRENGTH | MPa | 2620 | ASTM D790 | 23°C |
| ELASTICITY | MPa | 118.0 | ASTM D790 | 23°C |
| IMPACT STRENGTH | J/M | | ASTM D256 | WITH NOTCH t=1/8" |
| ...... | ...... | ...... | ...... | ...... |

F I G. 5 B

| No | CLASSIFICATION | FORMED OF | NAME OF CHEMICAL MATERIAL | CONTENT | CONTENT UNIT:ppm [mg/kg] | USED FOR |
|---|---|---|---|---|---|---|
| 1 | INORGANIC COMPOUND | METAL | Sb AND ITS COMPOUNDS | ○YES ●NO | | |
| 2 | | | Sb2O3 | ●YES ○NO | 600000000 00 | FIREPROOF AGENT FOR PLASTIC |
| 3 | | | As AND ITS COMPOUNDS | ○YES ●NO | | |
| 4 | | | Be AND ITS COMPOUNDS | ○YES ●NO | | |
| 5 | | | Cd AND ITS COMPOUNDS | ○YES ●NO | | |
| 6 | | | Co AND ITS COMPOUNDS | ○YES ●NO | | |
| 7 | | | Pb AND ITS COMPOUNDS | ○YES ●NO | | |
| 8 | | | Pb2CO3 | ○YES ●NO | | |
| 9 | | | PbHCO3 | ○YES ●NO | | |
| ⋯ | ⋯ | ⋯ | ⋯ | ⋯ | ⋯ | ⋯ |

FIG. 6

| NAME OF CHEMICAL PRODUCT | CHEMICAL PRODUCT | MANUFACTURER |
|---|---|---|
| B(OH)3 | | |
| CMR EXFOLIATING AGENT 123 | | |
| FC-43 | | 123 CORPORATION |
| FC-77 | | 123 CORPORATION |
| H2SiO3 | | 123 CORPORATION |
| HSG-R7-13 | | 123 CORPORATION |
| ETCHANT DICHLOROBENZENE | | 123 CORPORATION |
| DICHLOROBENZENE | | AB MANUFACTURER |
| OAP | | 123 CORPORATION |
| OCD T-6 Si—N—50000 | | 123 CORPORATION |
| OCD T-7 14000 | | 123 CORPORATION |
| OFPR—800 20cP | | AB MANUFACTURER |
| OFPR—800 50cP | | 123 CORPORATION |
| OFPR—800 THINNER | | 123 CORPORATION |
| OMR—83 35cP | | 123 CORPORATION |
| OMR—83 35cP SSR 20cP | | 123 CORPORATION |
| OMR—92 SS 60cP | | AB MANUFACTURER |
| OMR RINSE | | 123 CORPORATION |
| OMR DEVELOPER | | 123 CORPORATION |
| OMR EXFOLIATING AGENT 123 | | 123 CORPORATION |
| ONPR—800 HS—1 20cP | | 123 CORPORATION |
| PH3 1%/AR | | 123 CORPORATION |
| PH3 5%/AR | | 123 CORPORATION |
| RS—30 | | |
| RS—30 ETCHANT | | |
| SF6 | SULFUR FLUORIDE | AB MANUFACTURER |
| . | | 123 CORPORATION |
| . | | |
| . | | |
| . | | |
| . | | |

FIG. 7

```
MASTER INFORMATION (OMR EXFOLIATING AGENT 123)
1. NAME OF CHEMICAL MATERIAL (NAME, MANUFACTURER, ETC.)
2. COMPOSITION (INDICATION OF PURE MATERIAL AND MIXED MATERIAL)
3. DECOMPOSITION COMPOUND
4. PRINCIPAL IMPURITIES
5. PHYSICAL/CHEMICAL CHARACTERISTICS (BOILING POINT, ETC.)
6. HAZARD INFORMATION (FLASH POINT, ETC.)
7. ENVIRONMENTAL IMPACT INFORMATION (DISCOMPOSITION, ETC.)
8. TOXIC INFORMATION
9. CLASSIFICATION OF HAZARDOUS/TOXIC MATERIALS

REFER TO LINKED INFORMATION FOR FOLLOWING ITEMS

10. FIRST AID
11. IN CASE OF FIRE
12. AGAINST LEAKAGE OF CHEMICAL COMPOUNDS
13. INSTRUCTIONS FOR HANDLING
14. ACTIONS FOR PREVENTING LEAKAGE OF CHEMICAL COMPOUNDS
15. INSTRUCTIONS FOR WASTE
16. INSTRUCTIONS FOR TRANSPORTATION
17. MSDS AND PLP LAW REGULATION ITEMS
18. OTHER
```

FIG. 8

```
DETAIL INFORMATION (OMR EXFOLITATING AGENT 123)

1. NAME OF CHEMICAL PRODUCT, ETC.
2. COMPOSITION
   · INDICATION OF PURE MATERIAL AND MIXED MATERIAL

· CONTENT I
       NAME: O-DICHLOROBENZENE
       CAS NO:
       CONTENT: 50 (WT%)
       USED FOR:

· CONTENT II
       NAME: PHENOL
       CAS NO: 108-95-2
       CONTENT: 20 (WT%)
       USED FOR:

· CONTENT III
       NAME: ALKYLBENZENE SULFONATE
       CAS NO: 27176-87-0
       CONTENT: 50 (WT%)
       USED FOR:

· CONTENT IV
       NAME: TETRACHLOROETHYLENE
       CAS NO:
       CONTENT: 10 (WT%)
       USED FOR:
```

F I G. 9

| REGULATION | CONTROLS | COUNTRY | CONTENTS |
|---|---|---|---|
| AUSTRALIAN NATIONAL INDUSTRIAL CHEMICAL NOTIFICATION ACT SERVICES (NICNAS) | | AUSTRALIA | |
| CANADIAN ENVIRONMENTAL PROTECTION ACT (CEPA) | MATERIAL CONTROL | CANADA | |
| UNITED STATES TOXIC SUBSTANCES CONTROL ACT (TSCA) | CONCENTRATION & MATERIAL CONTROL | USA | |
| SUPERFUND AMENDMENTS AND REAUTHORIZATION ACT (SARA), EMERGENCY PLANNING AND COMMUNITY RIGHT-TO-KNOW ACT (EPCRA) | MATERIAL CONTROL | USA | |
| MINISTRY OF INTERNATIONAL TRADE AND INDUSTRY (MITI) LAW | | JAPAN | |
| NEW ZEALAND TOXIC SUBSTANCES ACT (TSA) | MATERIAL CONTROL | NEW ZEALAND | |
| NATIONAL ENVIRONMENTAL PROTECTION ACT (NEPA) | MATERIAL CONTROL | CHINA | |

FIG. 11

COMPANY NAME: 123 CORPORATION
ADDRESS: XYZ CITY
SECTION: 999 SECTION
STAFF: JOHN SMALL

NAME OF PRODUCT
   ABC·· ###123

CHARACTERISTICS OF MATERIALS
ONE PRODUCT, INDICATION OF MIXED MATERIAL: MIXED MATERIAL
   ABC·· ###123

| COMPONENT | CAS No. | REGULATION NO. | PROTECTION LAW NO. | CONTENT(%) |
|---|---|---|---|---|
| POLYESTER RESIN | Confidential | 7-713 | EXISTING | 70 |
| STYRENE ACRYLATE RESIN | 26655-10-7 | 6-186 | EXISTING | 15 |
| CARBON BLACK | 1333-86-4 | NOT UNDER CONTROL | NOT UNDER CONTROL | 9 |
| WAX | 8015-86-9 | NOT UNDER CONTROL | 11-(4)-90 | 4 |
| COLOR | 31714-55-3 | 5-3112 | EXISTING | 2 |
| . | . | . | . | . |
| . | . | . | . | . |

F I G. 1 3

| OCTOBER —ITEM — ROOM | GENERAL WASTE (INFLAMMABLE) | 350 | PAPER | 300 |
|---|---|---|---|---|
| OCTOBER —OFFICE | GENERAL WASTE (INFLAMMABLE) | 0 | PAPER | 70 |
| OCTOBER —SECTION | GENERAL WASTE (INFLAMMABLE) | 0 | PAPER | 0 |
| OCTOBER —SECTION — ROOM | GENERAL WASTE (INFLAMMABLE) | 350 | PAPER | 480 |
| ......... | ......... | ... | ...... | ... |

FIG. 14

| OFFICE | SUBSTANCE | MATERIAL | SECTION | AMOUNT | POINT OF CHIMNEY | SCATTERING IN AIR |
|---|---|---|---|---|---|---|
| NUMADU | | | | 3262029.44 | 2045244.6280 | 0 |
| 1997 | | | | 885504.55 | 474007.80 | 0 |
| 1998 | | | | 1266413.28 | 926620.080 | 0 |
| 1999 | | | | 1110111.61 | 644616.7480 | 0 |
| FIRST HALF OF YEAR | | | | 4799999999 | 513824.6080 | 0 |
| LAST HALF OF YEAR | | | | 352828.13 | 130792.140 | 0 |
| 001 ZINC STEARATE | | | | 171.75 | . | 0 |
| 001 ZINC CHLORIDE | | | | 13274.05 | . | 0 |
| 001 ANTIMONY OXIDE | | | | 5335.8 | . | . |
| . . . | | | | . | . | . |

FIG. 16

```
99-09-01 10:29:03  * * EXPENSES  INPUT ITEMS * *  NCAS474A
OPERATOR
OUTLINE    SEMINAR ON ENVIRONMENTAL MATTERS  FEE
NOTES·   SEMINAR ON ENVIRONMENTAL ACCOUNTING  FEE

FROM EDUCATIONAL EXPENSE      817-02 EDUCATIONAL EXPENSE

APPROPRIATED:     *** ROOM     --- GROUP
NAME   SEMINAR ON ENVIRONMENTAL ACCOUNTING    FEE
D/F No.
 CONSUMPTION TAX (1. TAXATION,  2. TAX-FREE,  9. NOT TAXABLE)
UNIT COST
TOTAL COST       52.500

ARBITRARY
  ITEM     02    FIELD __     ITEM    E41X
FOREIGN
CURRENCY   0  CURRENCY RATE        EXCHANGED MONEY____
 DEBT NO. ___
  ID NO. ___
DEBIT ITEM  2   ACCOUNTING ITEM 455
PRESS "EXECUTE" KEY, IF CORRECT
F1:EXPLANATION F2:CANCEL  F3:BACK   F4:  F5:ITEM EXPLANATION
F6:GUIDANCE F7:  F8:  F9:  F10:  F11:  F12:END
```

FIG. 19

| PLAN NAME | AMOUNT OF INVESTMENT | NUMBER OF YEARS TO REPAY | REDUCTION AMOUNT OF ENVIRONMENTAL IMPACT /YEAR (S) | REDUCTION AMOUNT OF COSTS FOR ENVIRONMENTAL MATTERS /YEAR (S) |
|---|---|---|---|---|
| ........ | A1 | B1 | C1 | D1 |
| ........ | A2 | B2 | C2 | D2 |
| ........ | A3 | B3 | C3 | D3 |
| ........ | ... | ... | ... | ... |

SYSTEM AND METHOD FOR PROVIDING ENVIRONMENTAL IMPACT INFORMATION, RECORDING MEDIUM RECORDING THE INFORMATION, AND COMPUTER DATA SIGNAL

BACKGROUND OF THE INVENTION

1. Field of the Invention

The present invention relates to an environmental impact information system, and, more particularly, to a system, method, recording medium, and computer data signal, for providing and recording environmental impact information, and for collecting information regarding various environmental impacts at an organization (company, corporation, etc.) so as to contribute to the decision making with respect to the management of the organization.

2. Description of the Related Art

To leave the earth with a full of nature and green to the future generations, it is essential to reduce bad effects (environmental impacts) on the environment. Hence, activities for reducing the environmental impacts are done at various organizations, such as companies, public organizations and the like.

To minimize the environmental impacts with high efficiency, it is important to know the environmental impacts at activities of the organization. For example, it is necessary to obtain the environmental impacts (those environmental impacts at each operational process) in the life cycle of products, using the idea of Eco-Balance.

Conventionally, there is no system for accurately obtaining the environmental impacts in the life cycle of the products. Thus, in many cases, the environmental conservation activities are done on the impulse or by individuals who personally care about the environment at the organization.

It is impossible to invest an unlimited amount of money for the environmental conservation activities. Hence, it is desired that a maximum level of environmental conservation can be achieved with a minimum amount of investment, further that certain economical benefits can be obtained.

However, the amount of investment (expenses) required for the environmental conservation activities at the organization and the effects thereof can not easily be shown on the financial analysis, and hence can not objectively be analyzed. Therefore, while promoting the environmental conservation activities at the organization, there has been a lack of information for determining how much amount of investment should be made to a particular field of the activities.

SUMMARY OF THE INVENTION

The present invention has been made in consideration of the above. It is accordingly an object of the present invention to provide a system, method, recording medium, and computer data signal, for efficiently minimizing environmental impacts and facilitating activities for gaining the economical benefit.

Another object thereof is to provide a system, method, recording medium and computer data signal, for facilitating the appropriate decision making with respect to the management regarding environmental matters, thereby contributing to a reduction in the environmental impacts.

Still another object thereof is to provide a system, method, recording medium and data signal, for obtaining environmental impacts in a product's life cycle, and for use in the environmental conservation activities and decision making with respect to the management of an organization.

Still yet another object thereof is to provide a system, method, recording medium and computer data signal, for obtaining expenses for environmental conservation and effects thereof, and for use in the environmental management.

In order to accomplish the above objects, according to the first aspect of the present invention, an environmental impact information system comprising:

an environmental impact information obtaining unit which obtains environmental impact information regarding an environmental impact at a plurality of processes included in activities of an organization;

an environmental impact information collector which collects the environmental impact information obtained by the environmental impact information obtaining unit; and an environmental impact information analyzer which analyzes the environmental impact information collected by the environmental, impact information collector, and obtains an reduction amount of the environmental impact.

According to this invention, the environmental impact information obtaining unit obtains environmental impact information regarding environmental impacts, for example, at a designing process, a manufacturing process, a distribution/sales process, a usage process (while products are used), a maintenance process and a collection/recycling process which are all included in the business activities. The environmental impact information collector collects the environmental impact information obtained by the environmental impact information obtaining unit, through a network, for example. The environmental impact information analyzer analyzes the environmental impact information collected by the environmental impact information collector, and obtains a set of environmental impacts in a product's life cycle. As a result of this, the system of this invention can acquire the set of environmental impacts in a product's life cycle, and refers to information representing the environmental impacts, so as to facilitate the decision making with respect to the management and environmental conservation activities.

The environmental impact information system may further include a chemical material information memory unit which stores in advance chemical-material information regarding chemical materials included in a plurality of to-be-supplied materials to be used for manufacturing products, and wherein the environmental impact information obtaining unit specifies each of the to-be-supplied materials to be used for manufacturing products, and reads out the chemical-material information corresponding to the specified to-be-supplied materials from the chemical material information memory unit.

The environmental impact information obtaining unit may measure an amount of consumed electricity, an amount of consumed fossil fuel, an amount of consumed water, an amount of consumed chemical materials, an exhaust amount of exhaust gas and an exhaust amount of waste while products are manufactured.

The environmental impact information obtaining unit may measure an amount of used fuel and an exhaust amount of exhaust gas while products are transported.

The environmental impact information obtaining unit may measure information representing a status of products.

The environmental impact information obtaining unit may measure an amount of consumed electricity, an amount of consumed fossil fuel, an amount of used water, an amount of used chemical materials, an exhaust amount of exhaust gas, an amount of waste, and an amount of maintenance in a predetermined unit while maintenance is performed for products.

The environmental impact information obtaining unit may measure an amount of consumed fuel and an exhaust amount of exhaust gas while products are being collected, and measure also information representing a recycling status of the collected products.

In order to achieve the above objects, according to the second aspect of the present invention, there is provided an environmental impact information system comprising:

environmental impact information obtaining means for obtaining environmental impact information regarding an environmental impact at a plurality of processes included in activities of an organization;

environmental impact information collection means for collecting the environmental impact information obtained by the environmental impact information obtaining means;

environmental impact information analyzing means for analyzing the environmental impact information collected by the environmental impact information collection means, and obtaining a set of environmental impacts in a product's life cycle; and report information generation means for generating report information in a predetermined format, based on the environmental impact information collected by the environmental impact information collection means and information representing the set of environmental impacts obtained by the environmental impact information analyzing means.

According to this invention, the environmental impact information obtaining means obtains environmental impact information regarding environmental impacts, for example, at a designing process, a manufacturing process, a distribution/sales process, a usage process (while products are used), a maintenance process and a collection/recycling process which are all included in the business activities. The environmental impact information collection means collects the obtained environmental impact information, through a network, for example. The environmental impact information analyzing means analyzes the collected environmental impact information, and obtains a set of environmental impacts in a product's life cycle. The report information generation means generates report information in a predetermined format, based on the environmental impact information collected by the environmental impact information collection means and information representing the set of environmental impacts obtained by the environmental impact information obtaining means. As a result of this, the system of this invention can acquire information representing the environmental impacts in the product's life cycle and refer to the acquired information, thereby contributing to the environmental conservation activities and the decision making with respect to the management of the organization.

In order to achieve the above objects, according to the third aspect of the present invention, there is provided an environmental impact information system including a plurality of process management devices for managing a plurality of processes included in activities of an organization and an environmental management device which are connected with each other through a predetermined network, and wherein:

each of the process management devices obtains environmental impact information regarding an environmental impact at each of the processes; and the environmental management device collects the environmental impact information obtained by each of the process management devices through a network, and obtains a set of environmental impacts in a product's life cycle based on the collected environmental impact information.

According to this invention, each of the process management devices obtains environmental impact information regarding environmental impacts, for example, at a designing process, a manufacturing process, a distribution/sales process, a usage process (while products are used), a maintenance process and a collection/recycling process which are all included in the business activities. The environmental management device collects the obtained environmental impact information, through a network, for example, and obtains a set of environmental impacts in a product's life cycle based on the collected information. As a result of this, the system of this invention can acquire the set of environmental impacts at the product's life cycle, thereby facilitating the environmental conservation activities and decision making on the business management.

The process management device may obtain information regarding chemical materials included in materials to be used for manufacturing products.

The process management device may measure an amount of used electricity, an amount of used fossil fuel, an amount of used water, an amount of used chemical materials, an exhaust amount of exhaust gas, and an exhaust amount of waste while products are manufactured.

The process management device may measure an amount of consumed fuel and an exhaust amount of exhaust gas while products are transported.

The process management device may measure information representing a status of each product.

The process management device may measure an amount of used electricity, an amount of used fossil fuel, an amount of used water, an amount of used chemical materials, an exhaust amount of exhaust gas, an exhaust amount of waste, and an amount of maintenance in a predetermined unit while maintenance is performed for products.

The process management device may measure information representing an amount of consumed fuel and an exhaust amount of exhaust gas while products are being collected and information representing a recycling status of the collected products.

In order to achieve the above objects, according to the fourth aspect of the present invention, there is provided an environmental impact information system, including a process management device for managing a plurality of processes included in activities of an organization and an environmental management device which are connected with each other through a predetermined network, and wherein:

the process management device includes environmental impact information obtaining means for obtaining environmental impact information regarding an environmental impact at each of the plurality of processes;

the environmental management device includes an environmental impact information collection means for collecting the environmental impact information which is obtained by the environmental impact information obtaining means, and an environmental impact analyzing means for analyzing the environmental impact information collected by the environmental impact information collection means, and obtaining a set of environmental impacts in a product's life cycle; and report information generation means for generating report information in a predetermined format, based on the environmental impact information collected by the environmental impact information collection means and information representing the set of environmental impacts obtained by the environmental impact information analyzing means.

According to this invention, each of the process management device includes the environmental impact information obtaining means for obtaining environmental impact information regarding environmental impacts, for example, at a designing process, a manufacturing process, a distribution/sales process, a usage process (while products are used), a maintenance process and a collection/recycling process which are all included in the business activities. The environmental impact information collection means collects the obtained environmental impact information, through a network, for example. The environmental impact information analyzing means analyzes the collected environmental impact information, and obtains a set of environmental impacts in a product's life cycle. The report information generation means generates report information in a predetermined format, based on the environmental impact information collected by the environmental impact information collection means and information representing the environmental impacts obtained by the environmental impact information analyzing means. As a result of this, the system of this invention can acquire the environmental impacts in the product's life cycle, thereby facilitating the environmental conservation activities and contributing to the decision making on the business management.

In order to achieve the above object, according to the fifth aspect of the present invention, there is provided a method for providing environmental impact information, the method comprising the steps of:

obtaining environmental impact information regarding an environmental impact at each of a plurality of processes included in activities of an organization;

collecting the environmental impact information obtained at the obtaining step;

analyzing a set of environmental impacts in a product's life cycle, based on the environmental impact information collected at the collecting step; and providing information regarding the set of environmental impacts obtained at the analyzing step.

According to this invention, the environmental impact information obtaining step obtains environmental impact information regarding environmental impacts, for example, at a designing process, a manufacturing process, a distribution/sales process, a usage process (while products are used), a maintenance process and a collection/recycling process which are all included in the business activities. The environmental impact information collection step collects the obtained environmental impact information, through a network, for example. The environmental impact information analyzing step analyzes the collected environmental impact information, and obtains a set of environmental impacts in a product's life cycle. The environmental impact information providing step provides, in the form of a report for use in decision making with respect to the business management, information representing the environmental impacts obtained at the analyzing step. As a result of this, the system of this invention can acquire information representing the environmental impacts, in the product's life cycle, thereby facilitating the environmental conservation activities and contributing to the decision making on the business management.

In order to achieve the above objects, according to the sixth aspect of the present invention, there is provided a computer readable recording medium which records a program for controlling a computer to execute a method for providing environmental impact information, the method comprising the steps of:

obtaining environmental impact information regarding an environmental impact at each of a plurality of processes included in activities of an organization;

collecting the environmental impact information obtained at the obtaining step;

analyzing a set of environmental impacts in a product's life cycle, based on the environmental impact information collected at the collecting step; and providing information regarding the set of environmental impacts obtained at the analyzing step.

In order to achieve the above objects, according to the seventh aspect of the present invention, there is provided a data signal embedded in a carrier wave and representing an instruction sequence for controlling a computer to execute a method for providing environmental impact information, the method comprising the steps of:

obtaining environmental impact information regarding an environmental impact at each of a plurality of processes included in activities of an organization;

collecting the environmental impact information obtained at the obtaining step;

analyzing a set of environmental impacts in a product's life cycle, based on the environmental impact information collected at the collecting step; and providing information regarding the set of environmental impacts obtained at the analyzing step.

BRIEF DESCRIPTION OF THE DRAWINGS

These objects and other objects and advantages of the present invention will become more apparent upon reading of the following detailed description and the accompanying drawings in which:

FIG. 5A is a diagram showing an example of a form for registering specification information of materials, and FIG. 5B is a diagram showing an example of a form for registering chemical material information;

FIG. 6 is a diagram showing an example of a list of chemical materials to be registered in a suppliable-material information DB;

FIG. 7 is a diagram showing an example of master information to be registered in the suppliable-material information DB;

FIG. 8 is a diagram showing an example of detail description information to be registered in the suppliable-material information DB;

FIG. 9 is a diagram showing an example of law-regulation information to be managed by a law-regulation DB;

FIG. 11 is a diagram showing an example of chemical material information according to product type;

FIG. 13 is a diagram showing an example of information regarding exhaust amounts of waste, collected according to each section for predetermined period of time;

FIG. 14 is a diagram showing an example of information representing types of chemical materials to be employed and an example of information which is collected according to each building for a predetermined period of time;

FIG. 16 is a diagram showing an example of an input display for inputting expenses for environmental conservation;

FIG. 19 is a diagram for explaining a state where the environmental accounting system extracts one or more reasonable investment plans from a plurality of investment plans.

DETAILED DESCRIPTION OF THE PREFERRED EMBODIMENT

Figure 1:
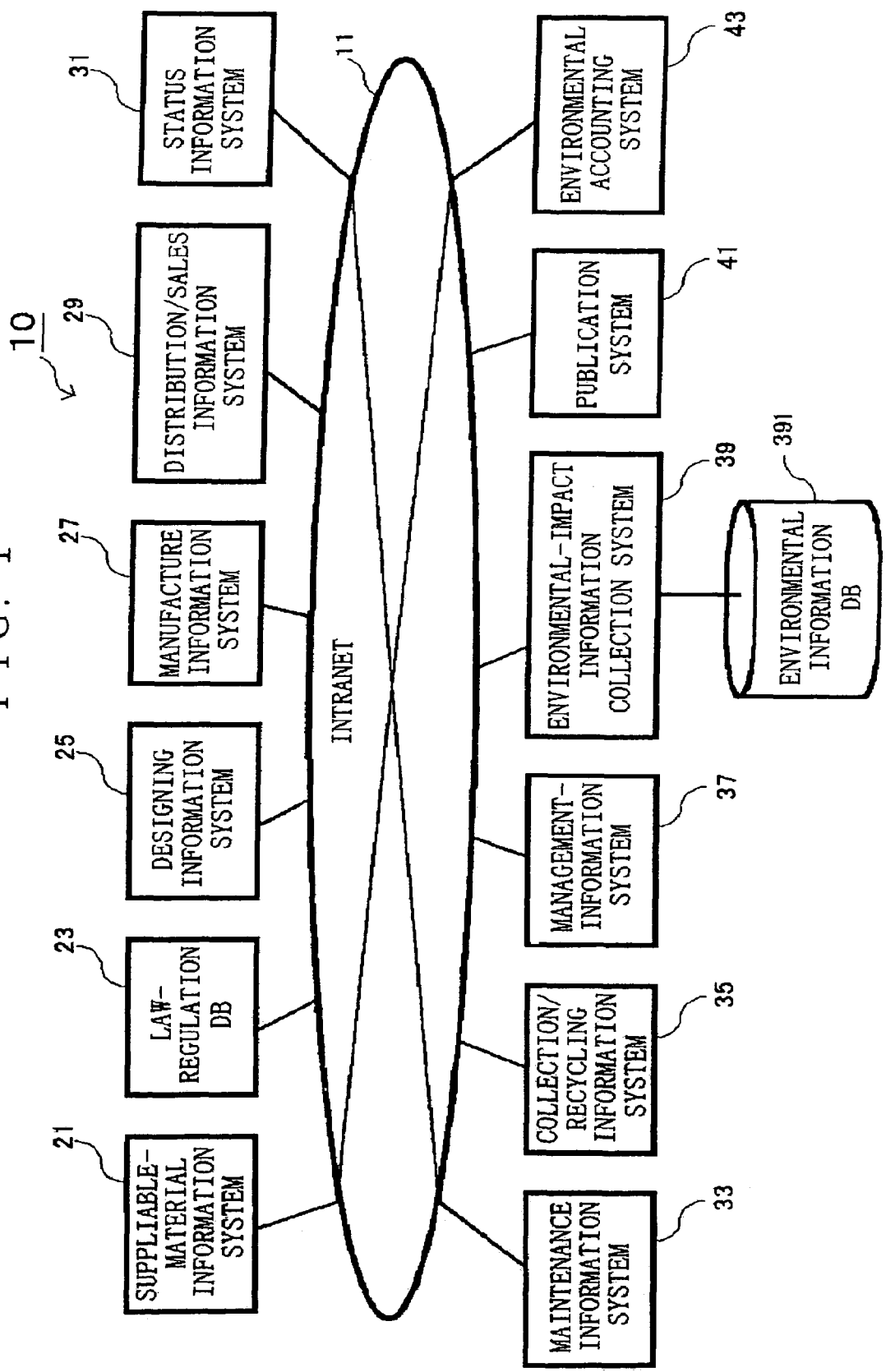
FIG. 1 is a diagram showing an example of the structure of an environmental-impact information system according to an embodiment of the present invention.

An environmental-impact information system according to an embodiment of the present invention will now be explained with reference to the accompanying drawings. FIG. 1 is a diagram showing the structure of an environmental-impact information system 10 of this embodiment.

The environmental-impact information system 10 integrally manages information representing environmental impacts on the environment as a result of activities of an organization (corporation, public organization, association, etc.), and uses the information for environmental management at the organization. As shown in FIG. 1, the environmental-impact information system 10 comprises a suppliable-material information system 21, a law-regulation DB 23, a designing-information system 25, a manufacture-information system 27, a distribution/sales information system 29, a status-information system 31, a maintenance-information system 33, a collection/recycling-information system 35, a management-information system 37, an environmental-impact information collection system 39, a publication system 41, and an environmental accounting system 43, which are all connected with each other through an Intranet 11.

The suppliable-material information system 21 collects information representing the chemical composition or environmental impact as a result of materials or parts supplied by the organization from distributors, and registers the collected information in a database.

The law-regulation DB 23 stores various laws, regulations, criteria, and the like, relating to the environmental matters. The law-regulation DB 23 stores requirements and criteria for various environmental standards (approval for environmental matters).

The designing-information system 25 designs various products, and manages information regarding chemical materials to be employed in manufacturing products.

The manufacture-information system 27 calculates an environmental impact at points where products are manufactured, and quantitatively manages information representing the environmental impact during manufacturing processes.

The distribution/sales information system 29 calculates environmental impacts at points where products are distributed and sold, and quantitatively manages information representing the environmental impacts during distribution/sales processes.

The status-information system 31 calculates environmental impacts at the time any sold or rented products are used, and quantitatively manages the environmental impacts during their usage.

The maintenance-information system 33 calculates environmental impact at a point where maintenance for the sold or rented products is performed, and quantitatively manages the environmental impacts during the maintenance processes.

The collection/recycling-information system 35 calculates environmental impacts at points where the sold or rented products are collected and recycled, and quantitatively manages the environmental impacts during collection/recycling processes.

The management-information system 37 manages personnel information, account information, and general-affair information, and the like of the organization. The management-information system 37 includes, for example, a personnel system, an account system, etc. The management-information system 37 calculates the sales and benefit regarding, for example, each product model, and collects information representing staff in charge of a predetermined product and information representing a purpose in using a particular building, factory, etc.

The environmental-impact information collection system 39 collects information (environmental impact information, etc.) relating to the environment from the suppliable-material information system 21, designing-information system 25, manufacture-information system 27, distribution/sales-information system 29, status-information system 31, maintenance-information system 33, collection/recycling-information system 35, and management-information system 37 through the Intranet 11. The environmental-impact information system 39 then registers the collected information in the environmental information DB 391. The environmental-impact information system 39 manages information regarding the environmental impact through the activities at the organization, based on the information registered in the environmental information DB 391.

The publication system 41 creates various environment reports based on the information collected by the environmental-impact information collection system 39.

The environmental accounting system 43 collects information representing the investment (cost) for activities on environmental conservation and information regarding the effect of the activities, and carries' out an environmental accounting process based on the collected information. The environmental accounting system 43 discloses information obtained by performing the accounting process, to the executives or managers of the organization. That is, the environmental accounting system 43 discloses the information of "the cost vs. effect of the activities on the environmental conservation" which can be used by the executives for decision making, and manages appropriate projects on the environmental investment.

Each system included in the environmental-impact information system 10 will now specifically be described.

Figure 2:
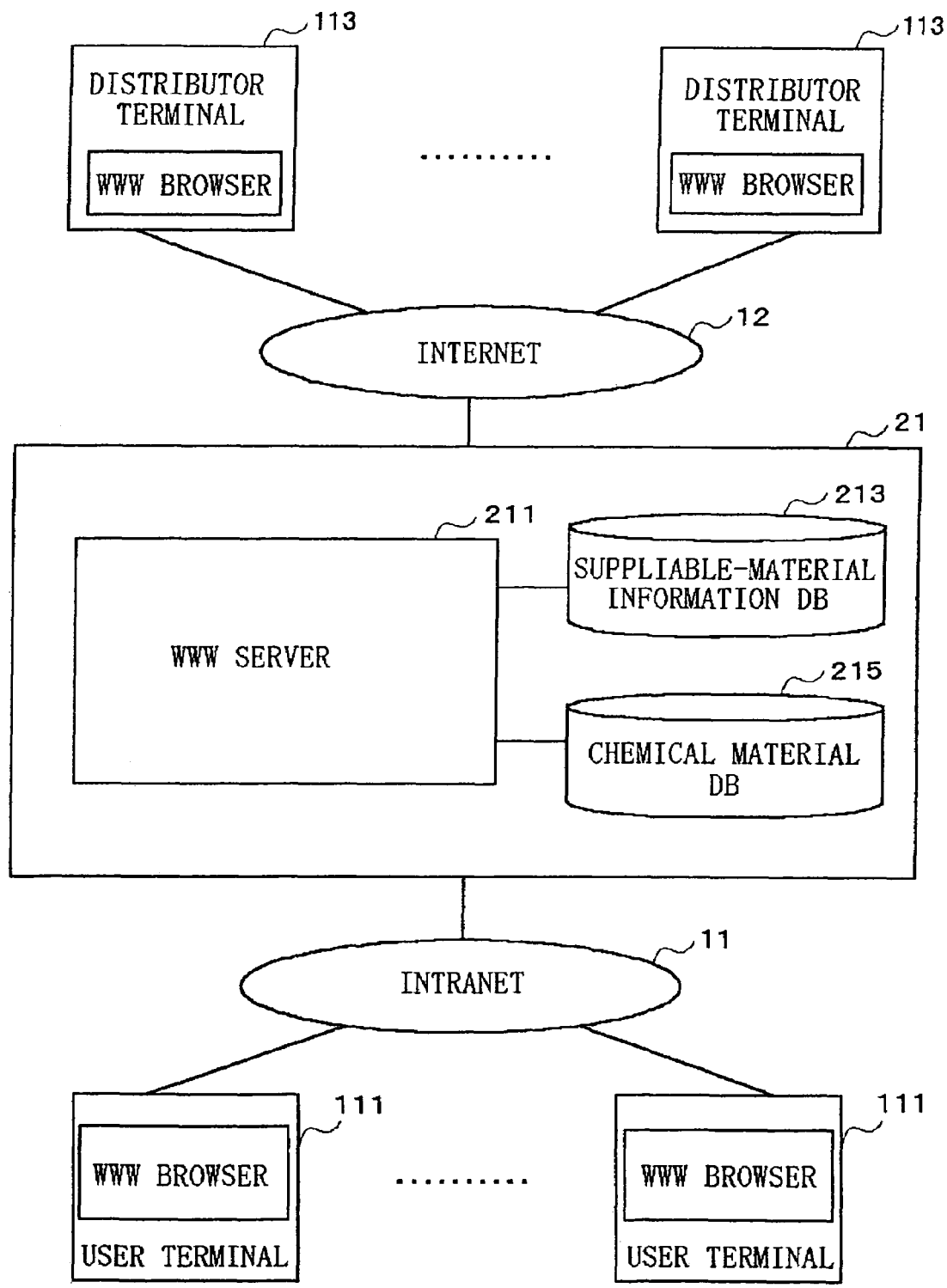
FIG. 2 is a diagram showing an example of the structure of a suppliable-material information system.

The suppliable-material information system 21 includes a WWW server 211, a suppliable-material information DB 213, and a chemical-material DB 215, as shown in FIG. 2.

The WWW server 211 is connected to a plurality of user terminals 111 installed in the organization, through the Intranet 11. The WWW server 211 is connected also to the Internet 12 through a non-illustrative firewall. The WWW server 211 can be accessed by a plurality of distributor terminals 113 through the Internet 12.

The WWW server 211 stores a plurality of Web pages (can create Web pages), and, in response to accessing the WWW server 211 by a user terminal 111 or distributor terminal 113 having the Web browser, provides the user terminal 111 or distributor terminal 113 with a corresponding Web page.

For example, the WWW server 211 extracts necessary information from the suppliable-material information DB 213 and/or chemical-material DB 215, using a CGI (Common Gateway Interface). Then, the WWW server 211 creates the Web page, and provides the user terminal 111 or distributor terminal 113 with the created Web page. Upon operation or inputting of buttons on the Web page on the user terminal 111 or distributor terminal 113, the WWW server 211 reads out target information stored in the suppliable-material information DB 213, etc., and registers (updates) predetermined information in the suppliable-material information DB 213.

The suppliable-material information DB 213 manages information representing specifications or chemical composition of materials or parts which a distributor wishes to distribute to the organization.

Particularly, the suppliable-material information DB 213 stores information sent from the distributor terminal 113 through the WWW server 211, as temporarily registered information. The temporarily registered information is referred by an inspector of a predetermined section in the organization. If the materials or parts shown in the temporarily registered information are accepted by the inspector, the suppliable-material information DB 213 manages this information as "registered information", and sends this information to the user terminal 111 in response to a request therefrom.

The chemical-material DB 215 manages information regarding various chemical materials. The chemical material DB 215 stores information corresponding to the information (registered information) stored in the suppliable-material information DB 213, and is accessed by the WWW server 211.

Figure 3:
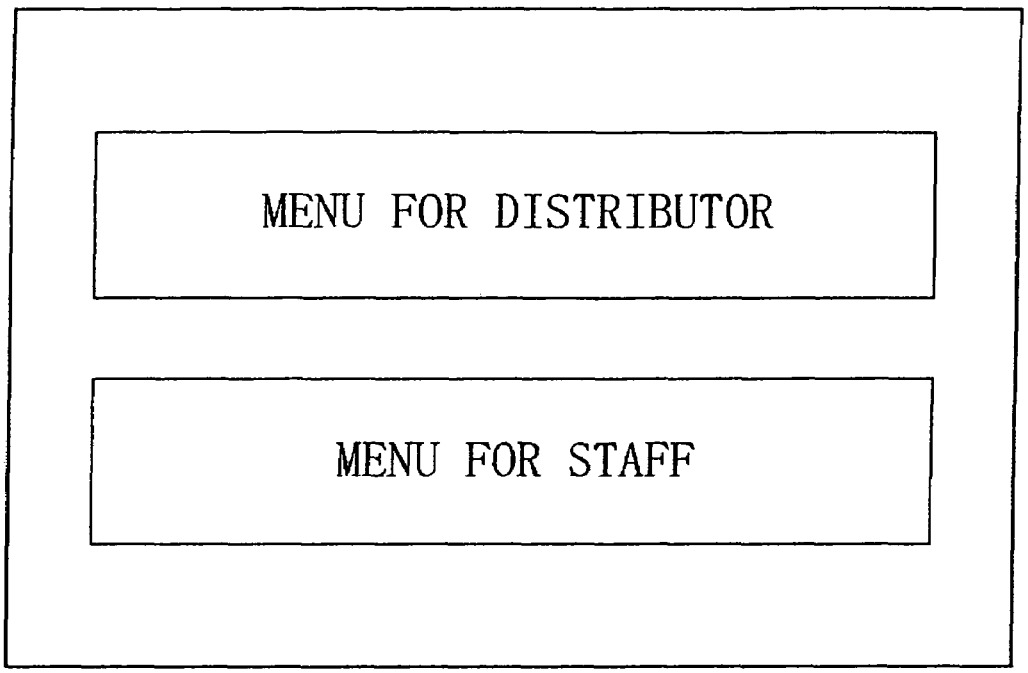
FIG. 3 is a diagram showing an example of a Web page (menu page) to be provided by the suppliable-material information system.

FIG. 3 shows an example of a Web page (menu page) stored in (created by) the WWW server 211. This Web page is displayed by a display unit (Web browser) included in the user terminal 111 and distributor terminal 113 having accessed the WWW server 211.

For example, in the case where the distributor wishes to newly distribute materials or parts to the organization, the distributor operates the distributor terminal 113 to access the WWW server 211, and controls the display unit to display the Web page shown in FIG. 3. If the distributor operates a mouse, etc., and clicks on a button "Menu for Distributor" included in the Web page shown in FIG. 3, the WWW server 211 provides the distributor terminal 113 with a Web page (register/correct images) shown in FIG. 4.

Figure 4:
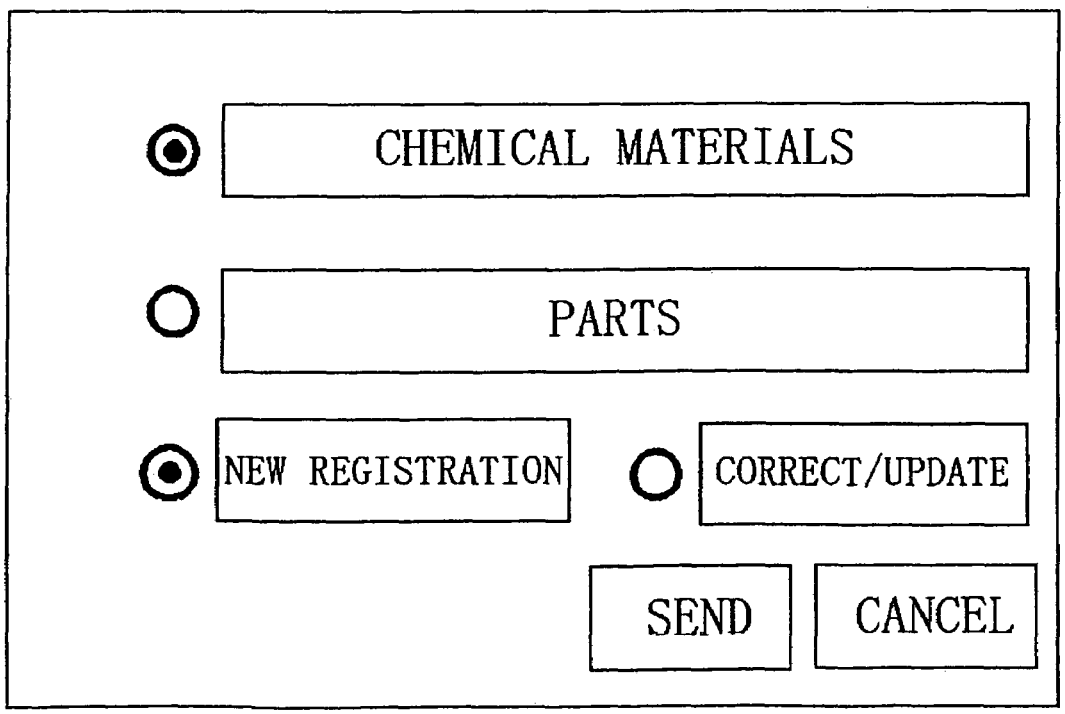
FIG. 4 is a diagram showing an example of a Web page (register/correct images) to be provided by the suppliable-material information system.

The distributor operates the mouse, etc., and selects either one of "Chemical Material" and "Parts" and either one of "New Registration" and "Correct/Update", and clicks on a button "Send", on the Web page illustrated in FIG. 4.

Upon selection of "Chemical Material" and "New Registration" on the side of the distributor terminal 113, the WWW server 211 creates a form for registering the material specifications and chemical material information, and the like, and provides the distributor terminal 113 with the crated form as a Web page. Particularly, the WWW server 211 provides the distributor terminal 113 with Web pages in the forms respectively shown in FIGS. 5A and 5B.

The distributor inputs material specification information, such as material names, characteristics (specifications), etc., in the created form on the Web page shown in FIG. 5A. Subsequently, the distributor also inputs the chemical material information, such as MSDS (Material. Safety Data Sheet), etc. in the Web page shown in FIG. 5B, and clicks on a predetermined "Send" button.

Upon reception of the chemical material information, etc. from the distributor terminal 113, the WWW server 211 stores the received chemical material information in a "temporary registration area" to be inspected, in the suppliable-material information DB 213.

If the chemical material information, etc. is stored in the "temporary registration area", the staff in charge of the environmental matters in a section (e.g. social and environmental section) of the organization operates the user terminal 111 to access the WWW server 211, and inspects the temporarily registered information. Specifically, the user terminal 111 verifies whether the user has the proper authority. After this, the user terminal 111 reads out the information registered in the "temporary registration area" of the suppliable-material information DB 213 through the WWW server 211, and displays the read information on the display unit. The staff in charge of the environmental matters inspects the displayed information, in consideration of the product (materials, parts) cost and reliability, and also from the aspect of the labor force, the environmental impact, etc.

If the materials or parts specified by the temporarily registered information are accepted, the WWW server 211 transfers the target information from the "temporary registration area" into a "registration area" of the suppliable-material information DB 213, and stores the information thereinto, in response to accessing the WWW server 211 by the user terminal 111.

Specifically, the WWW server 211 adds target chemical-material information, etc., into a list of FIG. 6 which is stored in the "registration area" of the suppliable-material information DB 213. Further, the WWW server 211 creates master information of the accepted materials or parts as shown in FIG. 7 and detail description information thereof as shown in FIG. 8. Then, the WWW server 211 stores the created information in the suppliable-material information DB 213.

FIGS. 7 and 8 are diagrams showing examples of the master information and detail description information in association with "OMR exfoliating agent 123" included in the list of FIG. 6. The master information shown in FIG. 7 corresponds to "OMR exfoliating agent" shown in FIG. 6, and is composed of the following eighteen items of "1. Name of Chemical Product", "2. Chemical Composition", "3. Decomposition Compound", "4. Unnecessary Impurities", "5. Physical/Chemical Characteristics", "6. Hazard Information", "7. Environmental Impact Information", "8. Toxic Material Information", "9. Classification of Hazardous/Toxic Materials", "10. First Aid", "11. Needs In Case of Fire", "12. Action Against Leakage of Chemical Compounds", "13. Instructions for Storage and Handling", "14. Action for Preventing Leakage of Chemical Compounds", "15. Instructions for Waste", "16. Instructions for Transportation", "17. MSDS and PLP Law Regulation Items", and "18. Other Information".

The detail description information shown in FIG. 8 specifically represents information of the item of "2. Chemical Composition", and corresponds to this item. Detail information regarding the rest of the seventeen items can similarly be created, and stored in the suppliable-material information DB 213. It is not necessary to create the detail description information of the all items. Those items may be linked to the general chemical information registered in the chemical material DB 215, so that their description information can thus be obtained.

On the contrary, in the case where the materials or parts specified in the temporarily registered information are not accepted by the inspector, the WWW server 211 informs the target distributor terminal 113 that the materials or parts can not be supplied (purchased), in response to accessing the WWW server 211 by the user terminal 111. Then, the WWW server 211 erases target chemical material information, etc., from the "temporary registration area" of the suppliable-material information DB 213.

Those information representing the accepted materials or parts and stored in the "registration area" of the suppliable-material information DB 213 as shown in FIGS. 6 to 8 are disclosed as registered information by the WWW server 211, and can be provided to the user terminal 111 in response to a request therefrom.

For example, the person (designer) in charge of environmental matters in the organization operates the user terminal 111 to access the WWW server 211, and controls the display unit to display the Web page shown in FIG. 3. After this, if the person operates the mouse, etc., to click on a button "Menu for Staff" included in the Web page of FIG. 3, the WWW server 211 creates a Web page for selecting or searching for material(s) registered in the suppliable-material information DB 213, and provides the user terminal 111 with the created Web page. Specifically, the WWW server 211 reads out the list shown in FIG. 6 from the suppliable-material information DB 213, creates a Web page based on the read information, and provides the user terminal 111 with the created Web page for selecting material(s).

The WWW server 211 provides the user terminal 111 with the Web page showing the master information or detail description information regarding the target materials, in accordance with the selection of the user terminal 111.

Accordingly, the information regarding the materials or parts to be employed in the organization is registered in the suppliable-material information DB 213, after the materials or parts are inspected in consideration of the environmental impact. The staff having the proper authority can refer to the registered information using the user terminal 111 (through the WWW server 211) at any time he/she wants. Hence, the staff can be aware of the specifications or chemical composition, etc. of most of the materials or parts to be delivered into the organization.

Referring back to FIG. 1, the law-regulation DB 23 manages information regarding laws or regulations relating to the environmental matters. Specifically, the law-regulation DB 23 stores information representing names of regulations or laws, fields of regulation, country names, and contents of regulations as shown in FIG. 9, and also stores detail laws, regulations, rules, explanatory information, and management information, and the like.

The law-regulation DB 23 manages information (conditions, standards, criteria, or the like) regarding various environmental standards (approval for environmental matters). Specifically, the law-regulation DB 23 manages information representing Type I (ISO14024), Type II (ISO14021), and Type III (ISO14025) of the environmental standards.

In Type I target products and authorization standards are prescribed. Type I is a label which can be authorized by a third-party system. For example, "Eco-Mark" (Japan Environmental Association) employed in Japan and "Blue Angel Mark" (Germany Environment Agency) in Germany come under Type I.

Type II is a label regarding the betterment of the environment by the effect of some products and services.

Type III is a label quantitatively indicates the environmental impact by the effect of a particular product.

Upon accessing the law-regulation DB 23 by a terminal of the staff through the Intranet 11, the law-regulation DB 23 performs a predetermined verification process for verifying the proper authority of the staff, and provides the terminal with requested information representing laws and/or environmental standards. Hence, the staff of the organization can easily be aware of the minimum requirements, conditions, or the like, which a target product needs to satisfy.

Figure 10:
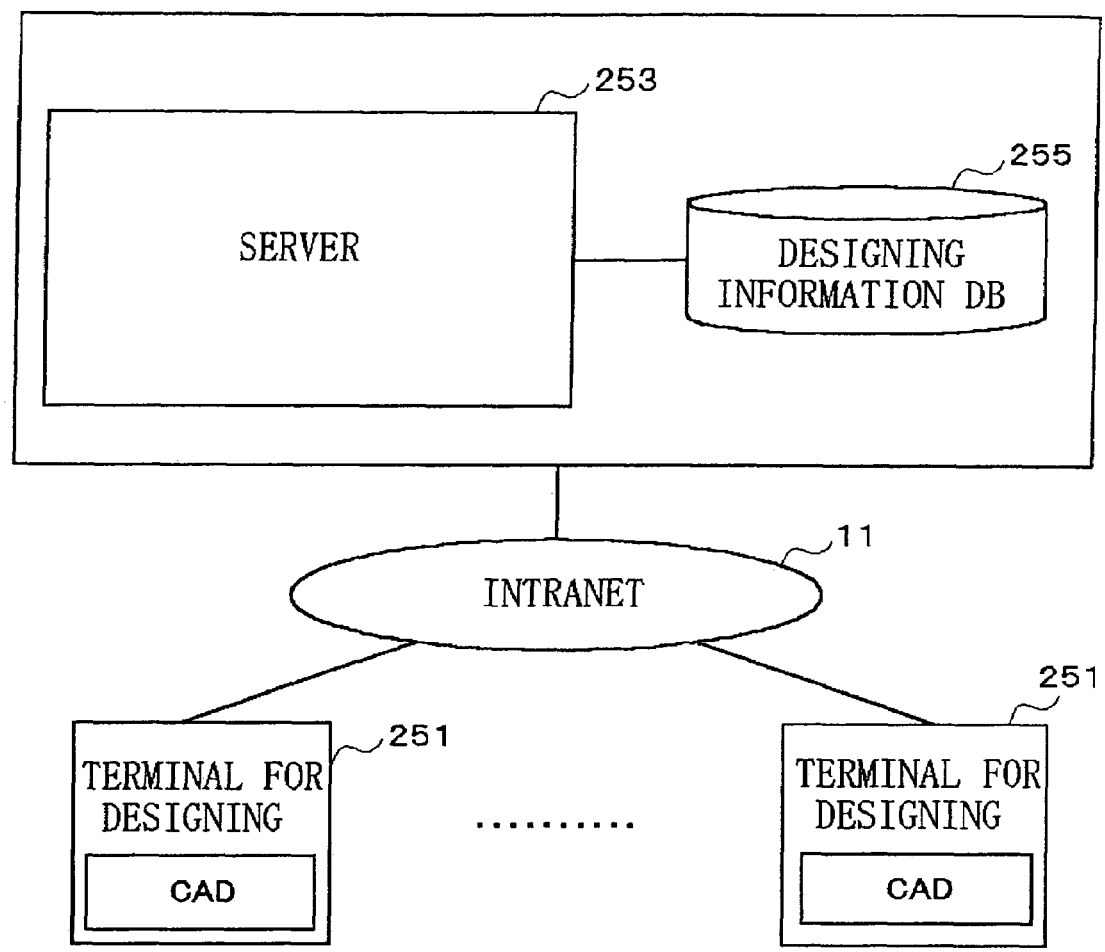
FIG. 10 is a diagram showing an example of the structure of a designing information system.

The designing information DB 25 includes a plurality of terminals 251 for designing, a server 253, and a designing-information DB 255, as shown in FIG. 10.

Each of the terminals 251 for designing includes, for example, a CAD system or the like having the Web browser, and is connected to the server 253 through the Intranet 11. The terminals 251 for designing are connected also to the WWW server 211 of the above-described suppliable-material-information system 21 through the Intranet 11. In other words, the designer operating each of the terminals 251 can access the suppliable-material information DB 213 through the Intranet 11 (the WWW server 211). The designer refers to the master information or detail description information of FIG. 7 or 8, selects materials or parts, and designs a product, in consideration of the environmental impact or toxic properties of materials.

Once the designer selects materials or parts using the terminal 251, and designs the product on the basis of the selected materials or parts, the server 253 creates a list of chemical materials to be employed in the product.

Specifically, the server 253 refers to the chemical-material information registered in the suppliable-material information DB 213, based on information representing the materials (parts type) and weight (quantity) and which is sent from the terminal 251, and creates a list of materials, as shown in FIG. 11. The server 253 creates a Web page including the created list, and provides the terminal 251 with the created Web page.

When to design a product using the terminal 251, the designer can obtain a list of chemical materials for use in manufacturing the product. The designer can collect information regarding the chemical materials or toxic substances to be used, from the list, and can acquire the quantitative data of the environmental impact by the effect of the product.

For example, in the case where a product "A" designed by the designer of the terminal 251 is composed of "material 1", "material 2" and the like, the server 253 refers to the suppliable-material information DB 213, and creates a list of chemical materials of "material a1" and "material a2". Once thus created list of chemical materials is sent to the terminal 251, the designer can collect information regarding the chemical materials or toxic substances of "material a1" and "material a2", and can acquire the quantitative data of the environmental impact by the effect of the product A.

While designing the product, if "material a1" is switched to "material b1", the server 253 creates a list of "material b1" and "material a2", and provides the terminal 251 with the created list. Hence, the designer can compare the chemical materials or toxic substances included in the product A before the switching, with those included in the product A after the switching.

Once the product is thus completely designed, the server 253 creates PLP (Product Liability Prevention) evaluation information, in response to accessing the server 253 by the terminal 251. Specifically, the server 253 collects and creates the PLP evaluation information including the component materials, country(s) selling the materials, reliable data in the environmental matters and product MADS information and the like, from the material specification information and chemical material information (the suppliable-material information DB 213).

Thus created PLP evaluation information is stored in the designing-information DB 255, and can be provided to the staff having the proper authority through the server 253, in response to a request therefrom. For example, the boss of the designer operates the terminal, refers to the PLP evaluation information regarding a target product(s) and managed by the designing information DB 255, and inspects the designing contents of the target product(s). At this time, the boss refers also to the regulations or standards stored in the law-regulation DB 23, and ascertains that the target product meets the regulations regarding the environmental matters and the standards.

Thus, the boss of the designer inspects the designing contents of the product, and can determine whether to approve the product, in consideration of the environmental matters or reliability of the product from the aspects of the environmental standards.

Figure 12:
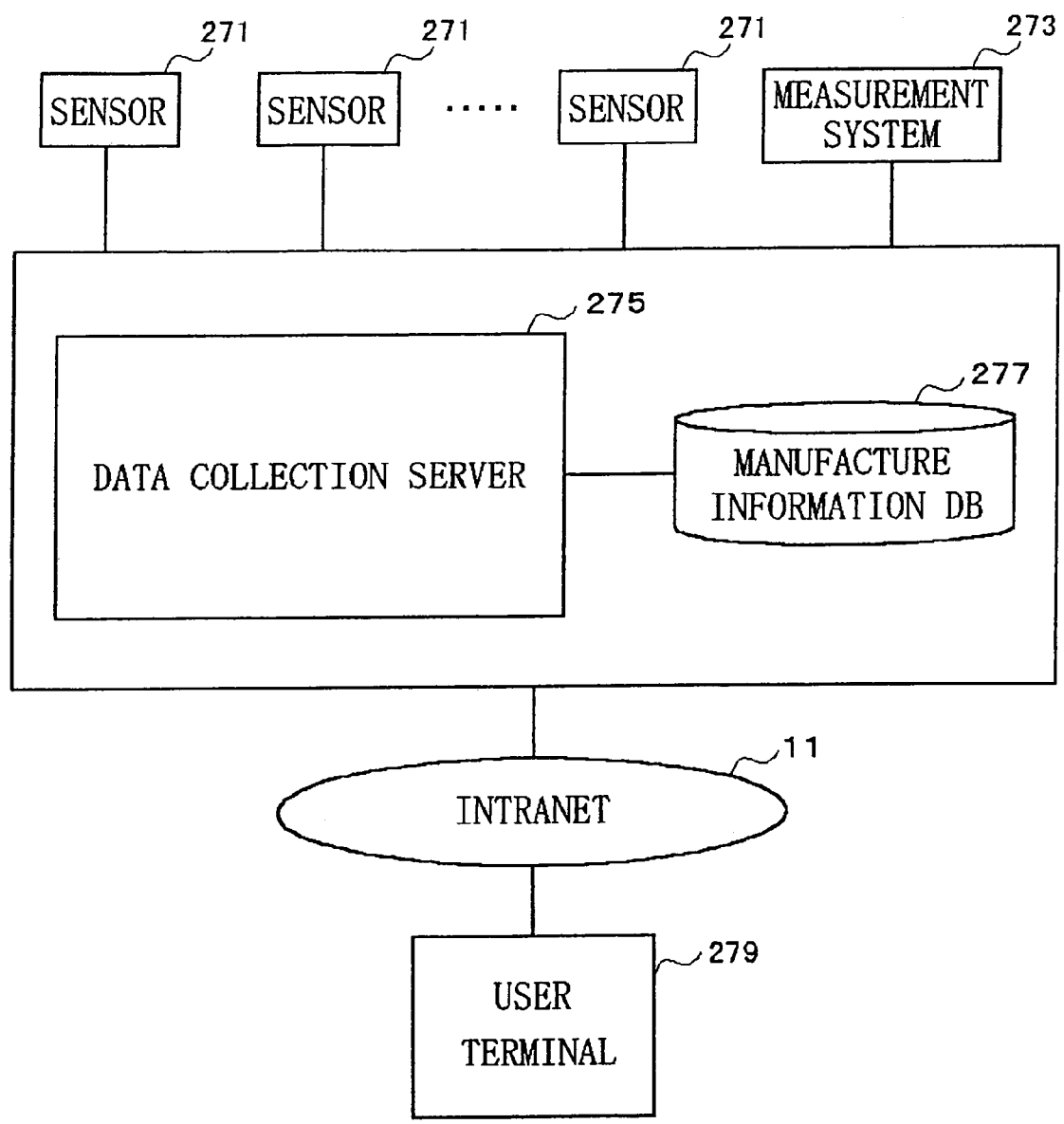
FIG. 12 is a diagram showing an example of the structure of a manufacture information system.

The manufacture-information system 27 comprises, as shown in FIG. 12, a plurality of sensors 271, a waste measurement system 273, a data collection server 275, a manufacture-information DB 277, and a user terminal 279. The manufacture-information system 27 is installed in each organization having, for example, a non-manufacture section.

Each of the plurality of sensors 271 may be a power meter, water meter, exhaust gas meter, exhaust gas densimeter, etc. That is, the sensor 271 serving as a power meter obtains the amount of utilized power at a place (factory, office, etc) manufacturing products, based on measured data. The sensor 271 serving as a water meter obtains the amount of utilized water and the amount of drained water, based on measured data. The sensor 271 serving as an exhaust gas meter obtains the amount of exhaust gas, based on measured data.

The sensor 271 serving as an exhaust gas densimeter obtains the $CO_2$ concentration, $NO_x$ concentration, and $SO_x$ concentration in exhaust gas.

Each of the sensors 271 supplies the data collection server 275 with the measured data. The data collection server 275 multiplies the measured value of the flow amount of exhaust gas by the measured value of the density of exhaust gas, which are sent from the corresponding sensors 271, thereby obtaining the exhaust amounts of $CO_2$, $NO_x$, and $SO_x$ at the place during the manufacture of the products.

The waste measurement system 273 includes a calculator, a terminal and the like, measures the weight of industrial waste, and registers information representing the waste name (or its ID) and the weight thereof in association with each other. The chemical information regarding the products or parts is registered in the above-described designing-information DB 255 during a designing process. Thus, the waste measurement system 273 can specify target products to be wasted, by measuring the weight, and can obtain the amount of chemical materials to be wasted. The waste measurement system 273 supplies the data collection server 275 with the measured information.

The data collection server 275 registers information sent from each sensor 271 and waste measurement system 273, in the manufacture information DB 277.

The data collection server 275 manages the usage context of fossil fuel at the organization during the manufacture process and the usage context of chemical materials. Specifically, the data collection server 275 obtains, from the user terminal 279, information regarding the amount (or purchase record) of utilized fossil fuel, such as gasoline, fuel oil, light oil, etc., and information regarding the amount (or purchase record) of the utilized chemical materials. Subsequently, the data collection server 275 registers thus obtained information in the manufacture information DB 277.

The manufacture information DB 277 manages information representing: the usage amount of various resources (amount of utilized electricity, amount of utilized fossil fuel, amount of utilized water, and amount of utilized chemical materials); exhaust amount of waste; exhaust amount of $CO_2$, $NO_x$, and $SO_x$; exhaust amount of materials to the sea; exhaust amount of materials to the air; exhaust amount of materials to be polluting the sea; and chemical materials. Such information represents the above aspects of the organization during the manufacture of products, and is registered in the manufacture information DB 277 through the data collection server 275. The manufacture information DB 277 manages the above information in association with each organization.

The data collection server 275 refers to the information managed by the manufacture information DB 277, and creates information representing exhaust amounts of waste which are obtained according to each section and predetermined period of time, as shown in FIG. 13. Similarly, the data collection server 275 creates information representing types and amounts of used chemical materials which are obtained according to each building and predetermined period of time, as shown in FIG. 14.

The distribution/sales information system 29 manages the environmental impact at processes of distributing/selling products. Specifically, the distribution/sales information system 29 obtains the number of transportation means, the number of products transported by one transportation means and the conveying distance of the products, and obtains an exhaust amount of exhaust gas and the consumption of fuel during the processes of distributing/selling the products.

Specifically, the distribution/sales information system 29 stores in advance the relationship between each transportation means (e.g. a 2-ton truck, 5-ton truck, freight train, ship, etc.), the consumption of fuel per unit distance, and the exhaust amount (e.g. $CO_2$, $NO_x$, $SO_x$, etc.) of exhaust gas. The distribution/sales information system 29 obtains the number of the transportation means, the conveying distance, and the number of conveyed products, and obtains the consumption of fuel and the exhaust amount of exhaust gas.

For example, the distribution/sales information system 29 obtains information employed transportation means, the distance of the products to be transported, and the number of products are transported, during a distribution process of transporting products from a predetermined factory to warehouse and further transporting the products from the warehouse to stores and also during a sales process of conveying products from the stores to predetermined places requested by users, respectively. The distribution/sales information system 29 obtains the consumption of fuel and exhaust amount of exhaust gas at the distribution and sales processes, based on the relationship among the calculated transportation means, the consumption of fuel per unit transportation distance and the exhaust amount of exhaust gas.

The distribution/sales information system 29 obtains and manages information representing the amount of utilized electricity at points where the products are distributed, the amount of utilized water, the amount of utilized fossil fuel (or the amount of purchased fossil fuel), the amount of utilized chemical materials (or the amount of purchased materials), and types and weight waste. In addition, the distribution/sales information system 29 obtains and manages information representing the consumption of electricity and/or the consumption of utilized water resources at points where the products are sold (e.g. stores).

Likewise the above-described manufacture information system 27 (the data collection server 275), the distribution/sales information system 29 can create information representing the obtained amount of exhausted waste, as shown in FIG. 13, and information representing the obtained types and weight of utilized chemical materials, as shown in FIG. 14.

Figure 15:
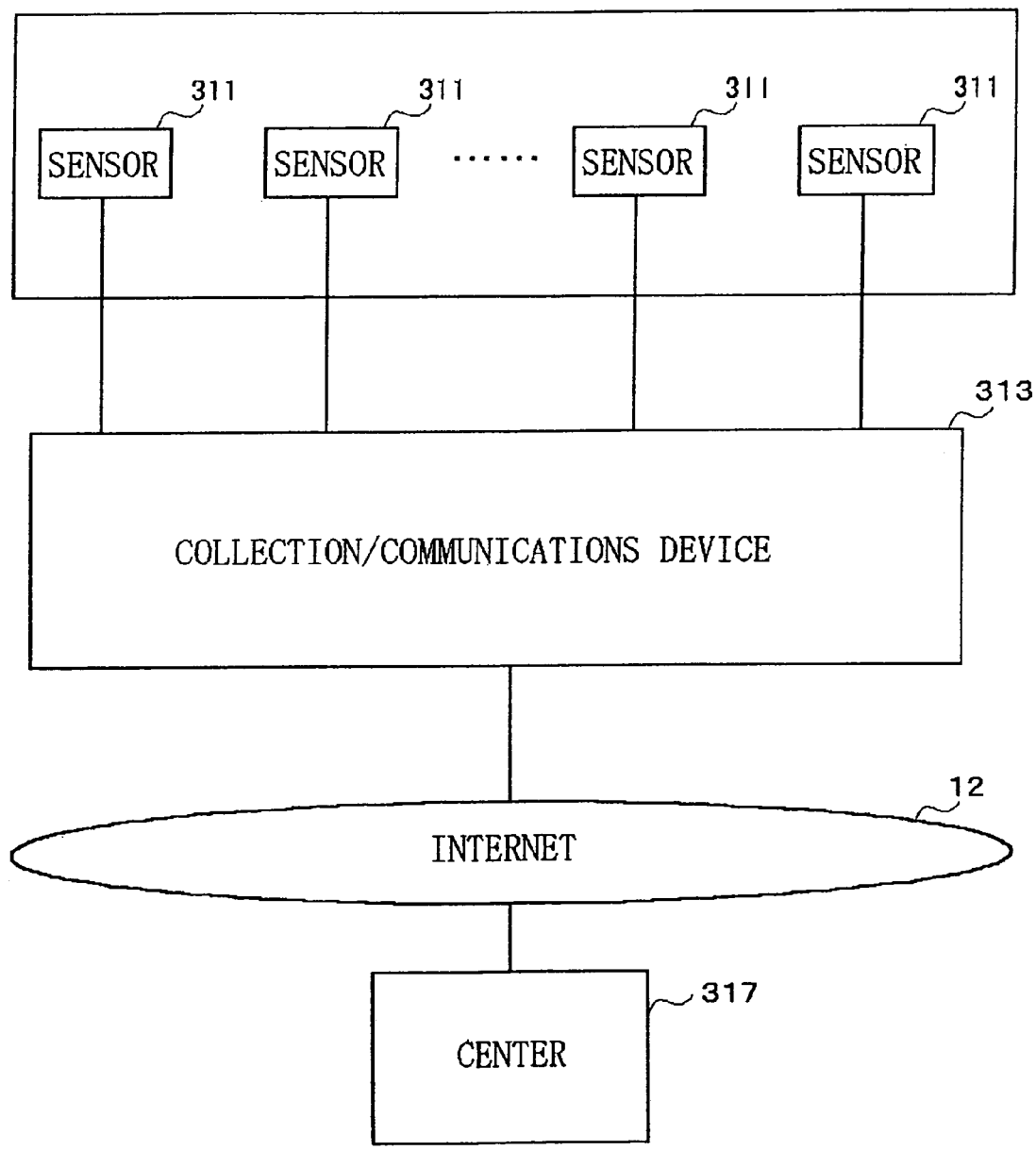
FIG. 15 is a diagram showing an example of the structure of a status information system.

The status-information system 31 obtains data representing the usage context of sold or rented products, and manages information representing their environmental impact in the state where the products are used. Specifically, the status-information system 31 includes, as shown in FIG. 15, a plurality of sensor 311, a collection/communications device 313, and a center 317.

The plurality of sensors 311 are installed respectively in target products to be monitored, and include various sensors for measuring the operational context of their corresponding product. For example, in the case where the target products to be monitored are office apparatuses, the sensors 311 serve as a power meter, a paper counter, and a toner counter, etc., respectively.

Each of the plurality of sensors 311 monitors and observes the usage context of each product, and provides the collection/communications device 313 with information representing the observed results.

The collection/communications device 313 collects and stores information representing the usage context of each product which is observed by each of the sensors 311. The collection/communications device 313 sends the stored information to the center 317 through the Internet 12 (or a public telephone line), in response to a polling signal therefrom.

The center 317 acquires the information sent from the collection/communications device 313, and collects the information representing the usage context of each product. Specifically, the center 317 classifies the information representing the usage contents according to product, product type and user, thereby registering the classified information in a predetermined database.

The maintenance-information system 33 collects data necessary for a maintenance process for taking measures to ensure that a predetermined sold/rented product is functioning properly. Particularly, the maintenance-information system 33 obtains the total number of times the maintenance process is performed (the total number of times the entire staff have visited the customers for the maintenance process) and the number of times the maintenance process is performed for each type of product possessed/rented by the customers, at maintenance points where the maintenance process is performed for the products. In the case where a part(s) needs to be replaced with a new one during the maintenance process, the maintenance-information system 33 collects and manages information regarding the part(s) to be replaced.

Likewise the above-described manufacture-information system 27 and the like, the maintenance-information system 33 manages information representing the consumption of power, the consumption of utilized water resources, the consumption of paper resources, the consumption of fossil fuel resources, and types and weight of waste.

The maintenance-information system 33 obtains the proportion of each number of times the maintenance process is performed for each type of product, to the total number of times the maintenance process is performed. The maintenance-information system 33 multiplies the value of the entire environmental impact at the maintenance process, by the above obtained proportion, thereby obtaining the environmental impact at the maintenance process to be performed for each type of product.

For example, in the case where the number of times the maintenance process is performed for a type of device A is one third of the total number of times and where the amount of gasoline used at the maintenance process is expressed as B, the maintenance-information system 33 calculates the environmental impact on the basis of that the amount of gasoline utilized for performing the maintenance process for the type of device A is B/3.

The collection/recycling information system 35 collects information regarding collection/recycling of products according to product type, thereby managing information representing the environmental impact at the collection/recycling process.

Specifically, the collection/recycling information system 35 collects information on how collected products (component parts) are recycled.

Usually, those collected products are examined by the staff of the organization, and some of the collected products are selected as recyclable products (so-called "second-hand" products). On the other hand, some of the collected products which can not be the recyclable products are taken apart, and parts of the products are examined. Some of the parts included in each product may be recyclable so as to be sent to the manufacture section or the organization.

Of those non-recyclable parts, those crushable parts can be recycled as materials. For example, if some crushable parts are metal, they can become metallurgical metal using a metallurgical process. Oily products can be decomposed, formed to be chemical materials, and formed to be solid fuel (e.g. solid fuel as a reducing agent in a furnace, etc.), thereby achieving to get thermal energy by burning the processed oily products.

The collection/recycling information system 35 acquires information regarding this process for recycling the products, and manages this information as "recycle information".

Likewise the above-described manufacture information system 27, etc., the collection/recycling information system 35 manages information representing the consumption of electric power, consumption of water resources, consumption of paper resources, consumption of fossil fuel, and type and weight of waste; at points where the products are collected and/or recycled.

The collection/recycling information system 35 creates information representing the amount of recycled resources (data representing the processed weight by each component), the recycling percentage, a list of parts (quantity and weight of parts), and transportation data regarding parts which are transported so as to be collected, in accordance with the recycle information and the information representing the consumption data.

The management-information system 37 includes a personnel information system installed in the personnel section of the organization, an accounting/financial information system installed in the accounting section, and a general-affair information system installed in the general affair section, for example. In this structure, the management-information system 37 manages the personnel information, accounting information, and general-affair information.

Specifically, the management-information system 37 refers to the personnel information, etc. to acquire information representing the staff being involved with a plurality of products in association with each other, and refers to the accounting information to acquire information representing the personnel expenses according to each product type.

The management-information system 37 refers to the accounting information to acquire information representing expenses (investment) spent for the environmental conservation. At this time, the management-information system 37 obtains, as the costs (the investment), an area cost, an upstream and downstream cost, a management activity cost, a research and development cost, a social activity cost, and an environmental-damage cost, etc., based on the accounting information.

The area cost is a cost for controlling down the environmental impact, resulting from the manufacturing and selling of the products and any service activities done within the area of the organization. The area cost includes a cost for antipollution measures, a cost for planting trees for protecting the global environment, and a cost for recycling resources.

The upstream and downstream cost represents an amount of money spent (or to be spent) for controlling down the environmental impact, resulting from the manufacturing and selling products and service activities, during upstream and/or down stream processes thereof.

The management activity cost represents an amount of money for performing management activities for controlling down the environmental impact.

The research and development cost represents an amount of money for performing the research and development activities for controlling down the environmental impact.

The social activity cost represents an amount of money for performing social activities for controlling down the environmental impact.

The environmental damage cost represents an amount of money for dealing with (repairing) the damaged environment.

Each of the above costs is input onto an input display shown in FIG. 16 in the management-information system 37, (financial/accounting information system). Data input onto the input display are categorized into corresponding one of the above costs, and added to the accounting information.

The management-information system 37 refers to the general-affair information to acquire information representing to what extent a plurality of buildings of factories are used for manufacturing corresponding products, in association with each other.

The environmental-impact information collection system 39 includes the environmental information DB 391, and periodically (e.g. every mid-night) collects information (the environmental-impact information, etc.) regarding the environmental matters which are separately managed by each of the above systems (the suppliable-material information system 21 to the management-information system 37). The environmental-impact information collection system 39 registers the collected information in the environmental information DB 391, and manages information regarding the environmental impact at the entire activities.

The environmental-impact information collection system 39 analyzes and modifies the information stored in the environmental information DB 391, thereby creating information regarding various matters on the environmental impact. For example, the environmental-impact information collection system 39 creates the usage context of chemical materials according to each factory, office, etc. in the organization and also information representing chemical materials included in each product. The environmental-impact information collection system 39 collects information representing the environmental impact, according to section, product, and process, and creates information regarding the recycling of products or parts.

If the environmental-impact information collection system 39 is accessed by a terminal of an executive at the organization through the Internet 11, it carries out a predetermined verification process for verifying the proper authority of the executive, thereafter to provide the target terminal with requested information regarding the maters on the environmental impact.

The publication system 41 creates various environmental reports, based on the information representing the matters on the environmental impact and created by the environmental-impact information collection system 39.

Specifically, the publication system 41 stores formats (templates) of various environmental reports in advance, and creates an environmental report in accordance with a specified format.

For example, the publication system 41 stores a format of MSDS in the form of a list according to product, a format (used in Japan) for environmental information according to product, an ISO format, an ANSI format, and the like. The publication system 41 acquires information corresponding to the specified format from the environmental-impact information collection system 39 (the environmental information DB 391), creates a suitable environmental report, and prints and outputs the created report.

The environmental accounting system 43 manages information representing the investment for the environmental conservation activities and their effects. The environmental accounting system 43 separately manages the information representing the effects of the environmental conservation activities, into environmental and economical effects.

According to the environmental effect, indicated is an amount of materials which is suitable for measuring a decrease or increase in the amount of environmental impact. For example, the environmental effect shows a reduction amount (kwh) in the power consumption or a reduction amount (ton) of $CO_2$, $NO_x$, $SO_x$, etc. On the other hand, according to the economical effect, indicated is a "monetary unit" for measuring a business benefit received by the organization as a result of the environmental conservation activities or for measuring a reduction in the required expenses.

The economical effect can be subdivided into an effect which can be calculated based on reliable information and an effect which can be calculated based on hypothetical assumption. The economical effect which can be obtained based on reliable information includes: a business profit derived by recycling the used products, etc. during manufacture processes; a cost reduction by saving energy during manufacture/service activities; and a cost reduction by saving resources during manufacture processes or by carrying out recycling activities. The economical effect based on hypothetical assumption includes an effect (an effect derived by avoiding risks) which is accidentally derived and an estimation effect of benefit contribution.

If the corresponding staff of the organization specifies an effect (environmental conservation effect and economical effect) which is directly or indirectly derived by the environmental conservation activities, he/she operates a predetermined terminal, and registers the specified effect in association with the investment contents in the environmental accounting system 43.

Figure 17:
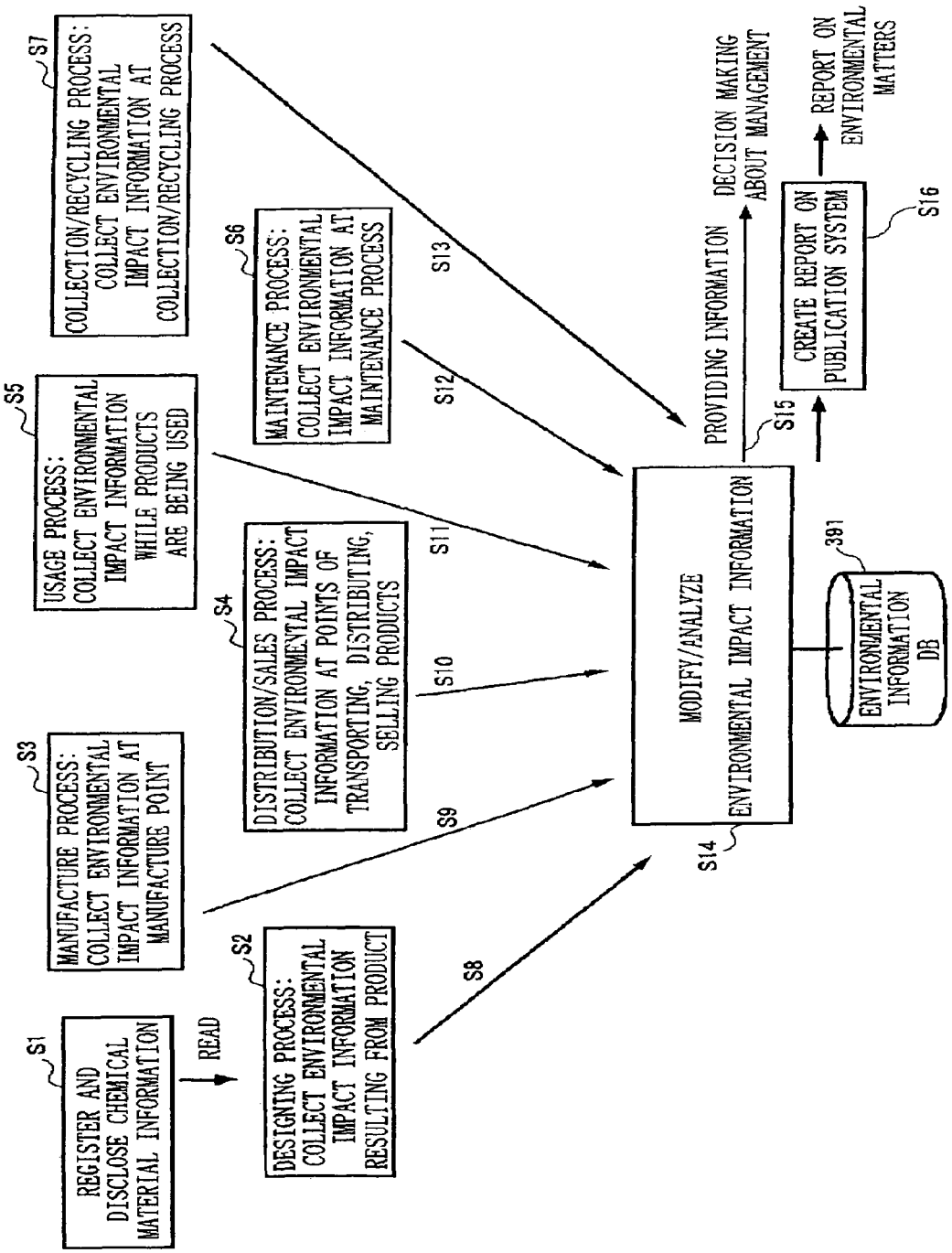
FIG. 17 is a diagram showing an example of a processing flow for explaining operations of the environmental-impact information system.

Operations of the environmental-impact information system 10 having the above-described structure will now be explained with reference to a processing flow shown in FIG. 17.

The suppliable-material information system 21 examines chemical material information, etc. regarding materials or parts, then registers the examined information in the suppliable-material information DB 213, and discloses the registered information to the public within the organization (Step S1).

The suppliable-material information DB 213 stores, as temporarily-registered information, the chemical material information sent from the distributor terminal 113 through the WWW server 211. Thus temporarily-registered information is sent to an examiner of each section by the WWW server 211. The examiner of each section examines information regarding the cost, reliability, and environmental impact. If accepted by this examination, the suppliable-material information DB 213 manages this information as registered information, and provides the user terminal 111 with the chemical material information, in response to a request therefrom.

During designing processes, the designing-information system 25 collects the information representing the environmental impact resulting from a product designed by a designer of the organization (Step S2).

The server 253 refers to the chemical material information, etc. registered in the suppliable-material information DB 213, based on the material information sent from the terminal 251, so as to create a list of chemical materials to be employed in manufacturing products. Upon completion of designing of products, the server 253 creates PLP evaluation information representing component materials, country(s) selling the product concerned, data representing the safeness in the environment, and product MADS information.

During manufacture processes, the manufacture information system 27 collects information representing the environmental impact at points where products are manufactured (Step S3).

The sensor 271 obtains the amount of electric power and the flow amount of exhaust gas at a factory or the like manufacturing products. The waste measurement system 273 specifies those products to be wasted, measures the amount of the waste, and obtains an amount of chemical materials included in the wasted products. The data collection server 275 registers, in the manufacture information DB 277, the information obtained by the sensor 271 and waste measurement system 273 and the information representing the usage context of fossil fuel at the points where the products are manufactured. The data collection server 275 calculates the exhaust amount of waste according to each section and predetermined range of period, based on the information registered in the manufacture information DB 277, and obtains types and amounts of used chemical materials according to each building and predetermined range of period.

During the distribution/sales processes, the distribution/sales information system 29 collects information representing the environmental impact at the time of transporting products and information representing the environmental impact at points where products are distributed and sold (Step S4).

The sales information system 29 obtains the number of the transportation means, the conveying distance of the products, and the number of conveyed products, and obtains also the consumption of fuel and exhaust amount of exhaust gas during the distribution and sales processes. The sales information system 29 collects usage context of fossil fuel at the distribution and sales points and usage context of chemical materials.

While the products are used, the status information system 31 obtains data representing the usage contest of sold products, and obtains information representing the environmental impact in the state where the sold products are used (Step S5).

The collection/communications device 313 collects and stores information representing the status of products observed by each of the sensors 311. The center 317 acquires this information sent from the collection/communications device 313, and collects information regarding the status of each product.

During the maintenance process, the maintenance information system 33 collects the information representing the environmental impact at points where the maintenance is carried out (Step S6).

The maintenance information system 33 obtains the proportion of the number of times the maintenance process is performed for each type of product to the total number of times the maintenance process is performed (the total number of times the staff have visited the customers' to perform the maintenance process). The maintenance information system 33 multiplies thus obtained proportion to the value of the entire environmental impact at the maintenance process, thereby deriving the environmental impact at the maintenance process, according to each type of product. Further, the maintenance information system 33 collects the usage context of fossil fuel and chemical materials at points where the maintenance process is performed.

At the collection/recycling process, the collection/recycling-information system 35 acquires information representing the collection and recycling status by each product, and collects the information representing the environmental impact at the time of collecting/recycling products (Step S7).

The collection/recycling-information system 35 collects the recycling information of the collection products (the component parts). The collection/recycling-information system 35 collects information representing the usage context of fossil fuel and chemical materials at a point where they are collected or recycled. The collection/recycling-information system 35 obtains information representing resources to be recycled, based on the collected information.

At the above-described processes, if each system collects the information representing the environmental impact, the environmental-impact information collection system 39 retrieves the collected information from each system, and stores the information in the environmental information DB 391 (Step S8 to S13). In response to a request from the terminal through the Intranet 11, the environmental information DB 391 provides the terminal with the stored information representing the environmental impact.

The environmental-impact information collection system 39 modifies and analyzes the stored information representing the environmental impact (Step S14).

Specifically, the environmental-impact information collection system 39 modifies information as follows:

1) The environmental-impact information collection system 39 modifies information collected from the suppliable-material information DB 213 (suppliable-material information system 21), obtains specification information of materials and chemical materials to be supplied, and obtains also information representing the safety standards of each chemical material.

2) The environmental-impact information collection system 39 acquires information representing each chemical material and its amount included in each product, according to each product, from the information collected from the designing information system 25.

3) The environmental-impact information collection system 39 obtains information representing the environmental impact, according to each factory, building, and section, from the information collected from the manufacture information system 27. The environmental-impact information collection system 39 obtains information representing the environmental impact at the point of manufacturing products, from the information collected from the manufacture information system 27. Note that the environmental impact at the manufacturing of products may directly or indirectly be generated during the manufacture. Hence, the environmental-impact information collection system 39 obtains the environmental impact from the information collected from the management-information system 37. In addition, the environmental-impact information collection system 39 divides the obtained environmental impact by occupied of the building, factory, etc. or the number of staff according to each product, thereby obtaining indirect environmental impact.

4) The environmental-impact information collection system 39 compiles statistics on the information collected from the distribution/sales information system 29, and obtains the environmental impact at the distribution/sales points, according to each product. Note that the environmental-impact at the distribution/sales points may directly or indirectly be generated at the time of distributing/selling products.

Specifically, the environmental impact to be directly generated at the time of distribution process is generated when the products are transported. For example, in the case where three types of products are transported for a distance of 100 km using one 2-ton truck, the environmental-impact information collection system 39 obtains the weights of the three types of products, and obtains also a value of the environmental impact at the time of transporting the products for the distance of 100 km using the 2-ton truck. After this, the environmental-impact information collection system 39 divides the obtained value of the environmental impact by each weight of product, thereby deriving the environmental impact at the time of transporting each type of products.

On the other hand, for the environmental impact to be indirectly generated at the distribution process, the environmental-impact information collection system 39 multiplies the transportation cost for each type of product by the sales obtained from the management-information system 37, so as to obtain the environmental impact according to each product.

5) The environmental-impact information collection system 39 complies statistics on the information acquired from the maintenance-information system 33. Subsequently, the environmental-impact information collection system 39 obtains the proportion of the number of times the maintenance process is performed for each product, to the total number of times (the total number of times the staff have performed the maintenance process), at each maintenance point. The environmental-impact information collection system 39 divides the value of the environmental impact at the maintenance point by the obtained proportion, so as to obtain the environmental impact for each product at the maintenance point.

6) The environmental-impact information collection system 39 complies statistics on the information acquired from the collection/recycling information acquired from the collection/recycling-information system 35, so as to obtain the environmental impact at the point where the collection and/or recycling is performed, according to each product. Specifically, the environmental-impact information collection system 39 obtains a value of the environmental impact at the process of transporting recycled products, and obtains the environmental impact thereat. The environmental-impact information collection system 39 obtains a value of the environmental impact at the process of taking part and/or transporting the parts which have been used as recycled parts. The environmental-impact information collection system 39 indicates a value of the environmental impact at the process of transporting, taking apart, crushing and modifying parts, and obtains the environmental impact thereat. Similarly, the environmental-impact information collection system 39 obtains a value of the environmental impact at the metallurgical or oiling process, or at the process of generating solid fuel or thermal energy from parts, and obtains the environmental impact thereat. The environmental-impact information collection system 39 divides the value of the entire environmental impact by each type of product, in accordance with a recycling possibility of products, according to each type of product. The environmental-impact information collection system 39 then obtains the environmental impact at the process of collecting and recycling products, according to each type of product. For the environmental impact to be indirectly generated, the environmental-impact information collection system 39 obtains the sales data acquired from the management-information system 37, according to each type of product.

Having performed the above processes of modifying the environmental impact information, the environmental-impact information collection system 39 obtains the environmental impact at each process, according to each type of product. Then, the environmental-impact information collection system 39 obtains a series of environmental impacts at the lifecycle of each type of product, and registers the obtained environmental impacts in the environmental information DB 391.

In response to a request from a terminal connected to the Intranet 11, the environmental-impact information collection system 39 performs a process for verifying the information, representing the environmental impact and modified and analyzed in the above step S14, thereafter to provide the terminal of executives etc. with the verified information (Step S15).

For example, the manager or staff in charge of the environmental matters operates a terminal to refer to the environmental impact information registered in the environmental information DB 391, and examines the environmental impact information, etc. from various aspects. Then, the manager, etc. makes decisions on the management involving the environmental matters, points out improvements in the management, and issues instructions to corresponding section of the organization.

In the case where to create an arbitrary report on the environmental matters, the staff in charge of the environmental matters operates the terminal, specifies a particular format, and instructs the publication system 41 to create an environmental report. Upon reception of this instruction, the publication system 41 retrieves information corresponding to the specified format from the environmental information DB 391, creates a suitable report, and outputs (prints) the created report (Step S16).

Accordingly, the manager, etc. can accurately be aware of the environmental impact at the organization, entirely, by the operations of the environmental-impact information system 10. What the manger needs to be concerned now is about how to reduce the environmental impact at the organization. It would be too costly to reduce the environmental impact, and the investment would newly be required for achieving the reduction in the environmental impact. However, if investment for the reduction in the environmental impact is done in a unlimited or lax manner, the organization can not desirably be managed. In consideration of the above, the environmental accounting system 43 creates information for realizing a reduction in the environmental impact with an appropriate amount of investment, and provides the manager, etc. with the created information.

Figure 18:
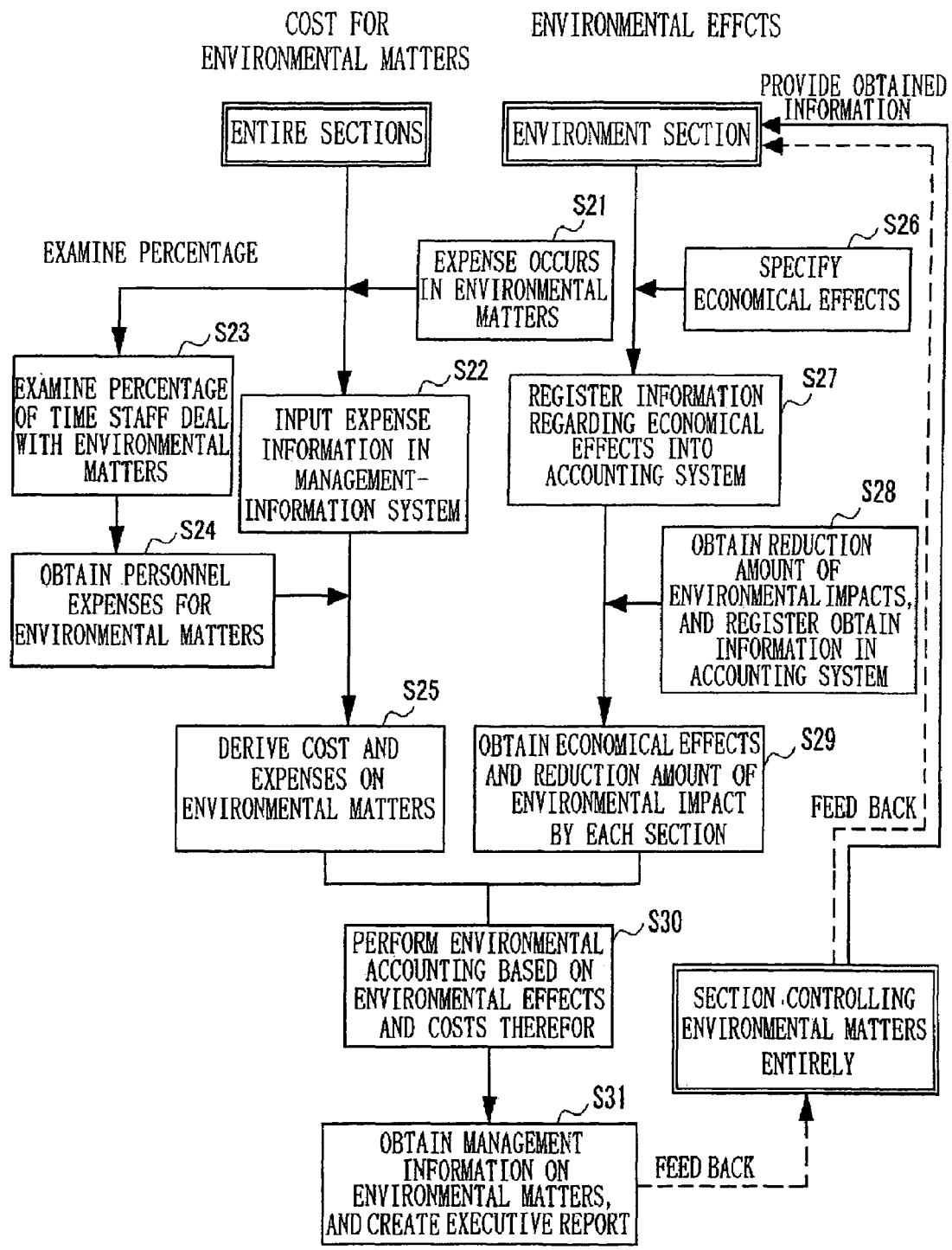
FIG. 18 is a diagram showing an example of an environmental accounting process to be carried out by an environmental accounting system.

The environmental accounting system 43 carries out an accounting process while comparing the expenses and environmental effects. The accounting process will now be explained with reference to FIG. 18.

In the entire sections of the organization, if the expense occurs in the environmental measures, the staff in charge of book-keeping in each section writes down the expense on a slip (Step S21). At this time, the person specifies what environmental impact should be improved at that expense, and he/she operates the terminal, and inputs the written information regarding the environmental matters into the management-information system 37 (Step S22). The management-information system 37 stores the input information.

The management-information system 37 examines the percentage (exclusive percentage) of the time the entire staff deal with the environmental matters, of their entire work hours (Step S23). The management-information system 37 multiplies the personnel expenses of each staff by the exclusive percentage, so as to derive the personnel expenses for the environmental matters (Step S24).

The environmental accounting system 43 reads out and obtains information representing the expenses in the environmental measures and information representing the personnel expenses for the environmental matters, from the management-information system 37 (Step S25).

The staff in charge of book-keeping in each environmental-matter section of each office specifies the economical effects which are derived directly or indirectly by the environmental conservation activities (Step S26).

The staff in charge of book-keeping in each section operates the terminal, and registers in the environmental accounting system 43 information representing the economical effects in association with office/section information (an ID, etc. for identifying a corresponding section of an office) (Step S27). The economical effect can be subdivided into an effect which can be calculated based on reliable information and an effect which can be calculated based on hypothetical assumption. The staff in charge of book-keeping of each section adequately obtains both the economical effect based on reliable information and the economical effect based on hypothetical assumption, and registers the obtained effects in the environmental accounting system 43.

The environmental-impact information collection system 39 obtains a reduction in the environmental impact as a result of activities on the environmental conservation in each office, based on the information stored in the environmental information DB 391, and registers the reduction in the obtained environmental impact in association with the office/section information in the environmental accounting system 43 (Step S28).

The environmental accounting system 43 obtains the registered economical effect and the reduction amount in the environmental impact, according to each section of an office (Step S29).

The environmental accounting system 43 performs environmental accounting (calculates the expenses on the environmental matter), based on the expense in the environmental measures and environmental effects (Step S30). That is, the environmental accounting system 43 compiles statistics on the expenses on the environmental measures, using the expenses and personnel expenses obtained in the step S25 and also the information representing the economic effect and the reduction in the environmental impact which are obtained in the step S29.

The environmental accounting system 43 obtains comparison information of "the expenses in the environmental measures vs. the reduction in the environmental impact" and also "the expenses in the environmental measures vs. the economical effect", according to each type of product, process, and office.

The environmental accounting system 43 obtains comparison information of "the expenses in the environmental measures vs. the reduction in the environmental impact" and also "the expenses in the environmental measures vs. the management information for the environmental matters including the economic effects". After this, the environmental accounting system 43 creates a report to be shown to the executives of the organization (Step S31).

The manager or executives refers to the management information representing the environmental matters which is shown on the report, considers the calculated expenses and the environmental effects, and finds out a method for reducing the environmental impact and improving the management of the organization. After this, the manager or executives gives instructions based on the considerations of the above to a section controlling the environmental measures to be processed. Upon this, staff in charge of the environmental measures in this section gives instructions to each environmental-matter section of each office.

According to the above-described accounting process, the manager or executives can be aware of the relationship between the expenses in the environmental measures and their environmental effects. In addition, the manager or executives can take some actions for realizing a reduction in the environmental impact with an adequate amount of investment, and hence contributing to improve the management of the organization.

Further, in the case where a plurality of investment plans are made for activities on the environmental conservation, the environmental accounting system 43 may specify the investment plans in order of ascending economic effect.

For example, as shown in FIG. 19, in the case where a plurality of investment plans are made, the operator operates the terminal to input, into the environmental accounting system 43, some information items of "Plan Name", "Amount of Investment Ai (A1, A2, A3 . . . )", "Number of Years to Repay (estimated number of years to maintain the effects) Bi (B1, B2, B3 . . . )", "(Reduction Amount of Environmental Impact)/Year(s) Ci (C1, C2, C3 . . . )", and "(Reduction Amount of Expenses)/Year(s) Di (D1, D2, D3, . . . )". Note that "i" represents a natural number.

Then, the environmental accounting system 43 obtains the relationship between the expenses and environmental effects, in accordance with the following Equation 1.

$$Ei=Di \times Bi/Ai \quad \text{Equation 1}$$

Now, the environmental accounting system 43 sorts the investment plans (Ai, Bi, Ci, Di, Ei) in order of ascending level of the relationships Ei between the expenses and environmental effects.

After the investment plans (Ai, Bi, Ci, Di, Ei) are sorted, they are expressed respectively as An, Bn, Cn, Dn and En.

Then, the operator sets into the environmental accounting system 43 that a predetermined amount (Y) of environmental impact should be reduced in a predetermined period of time (X years).

The environmental accounting system 43 obtains a reduction amount of the environmental impact in an X year(s), for each investment plan in the sorted order (in order of ascending levels of the relationship between the expenses and effects). Note that in the case where "the number of years to repay" Bn is smaller than X, X=Bn (obtain a reduction amount of the environmental impact in a Bn years).

The environmental accounting system 43 repeats the above procedures, and competes until the reduction amount of the environmental impact reaches a target point Y.

The environmental accounting system 43 settles an adequate amount of investment, in accordance with the above procedures, as follows:

Number of investment plans on environmental matters: Number "m" of repetition times of the above procedures;

Total amount of investments $\Sigma An$; n=1 to m; and

Estimated amount of reduction in environmental measures: $\Sigma(Dn \times X)$; N=1 to m.

The environmental accounting system 43 obtains an adequate amount of investments for each process (of supplying materials, etc., manufacturing products, transporting products, etc.), thereby enabling to compare the environmental effects between the plurality of processes based on the investments. The environmental accounting system 43 may also compare the entire investment plans in their entirety without dividing each plan into processes, and determine an a preferable investment plan, thereby to achieve the best mix of the amount of investment and the environmental effects.

The present invention is not limited to the above embodiment, and various embodiments and changes may be made thereonto without departing from the broad spirit and scope of the invention. For example, as seen from FIG. 1, the environmental-impact information system 10 comprises each of the above systems (the designing-information system 25, the manufacture information system 27, and the like), in association with the above processes of designing products, manufacturing products, and the like. However, the structure of the environmental-impact information system 10 is not limited to this. The structure of the environmental-impact information system 10 can desirably be changed, in consideration of processes to be carried out by or management system of an organization.

In the above embodiment, in the case where the environmental-impact information system 39 obtains the indirect environmental impact, it obtains the environmental impact from the information acquired from the management-information system 37. Further, the environmental-impact information system 39 divides the obtained environmental impact by the occupied area of buildings according to product type or by the number of staff. However, a method for obtaining the indirect environmental impact is arbitrary.

In the above embodiment, the environmental-impact information collection system 39 collects the environmental impact information which has partially been modified by each of the systems (the designing-information system 25 to management-information system 37). However, the environmental-impact information collection system 39 may modify the environmental impact information as needed, without modifying the information in any of the systems other than the environmental-impact information collection system 39.

The system of the present invention can be realized by a general-purpose computer. For example, a program for executing the above-described processes may be installed into a computer from a medium (an FD, CD-ROM, DVD or the like), and the program may run on an OS (Operating System) to realize the system of the present invention. The program and data may be stored in a disk device, etc. installed into the server device on the Internet, and embodied in a carrier wave so as to be downloaded.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2000-287772 filed on Sep. 21, 2000, and including specification, claims, drawings and summary. The disclosure of the above Japanese Patent Application is incorporated herein by reference in its entirety.

What is claimed is:

1. An environmental impact information system, comprising:
an environmental impact information obtaining unit which obtains environmental impact information regarding an environmental impact at a plurality of processes included in activities of an organization;
an environmental impact information collector which collects the environmental impact information obtained by the environmental impact information obtaining unit;
an environmental impact information analyzer which analyzes the environmental impact information collected by said environmental impact information collector, and obtains an reduction amount of the environmental impact, and
an environmental impact calculation unit which calculates an environmental conservation effect and an economical effect brought by an environmental measure taken in each of the plurality of processes.

2. The environmental impact information system according to claim 1,
wherein the environmental impact calculation unit is configured to perform the calculation of the environmental conservation effect based on a reduction amount in each process of resources or based on a reduction amount in each process of wastes, and to perform the calculation of economical effect based on a cost reduction in each process and cost reduction in manufacturing and recycling processes.

3. The environmental impact information system according to claim 1, wherein
said environmental impact information obtaining unit measures an amount of consumed electricity, an amount of consumed fossil fuel, an amount of consumed water, an amount of consumed chemical materials, an exhaust amount of exhaust gas and an exhaust amount of waste while products are manufactured.

4. The environmental impact information system according to claim 1, wherein said environmental impact information obtaining unit measures an amount of used fuel and an exhaust amount of exhaust gas while products are transported.

5. The environmental impact information system according to claim 1, wherein said environmental impact information obtaining unit measures information representing a status of products.

6. The environmental impact information system according to claim 1, wherein
said environmental impact information obtaining unit measures an amount of consumed electricity, an amount of consumed fossil fuel, an amount or used water, an amount of used chemical materials, an exhaust amount of exhaust gas, an amount of waste, and an amount of maintenance in a predetermined unit while maintenance is performed for products.

7. The environmental impact information system according to claim 1, wherein
said environmental impact information obtaining unit measures an amount of consumed fuel and an exhaust amount of exhaust gas while products are being collected, and measures also information representing a recycling status of the collected products.

8. An environmental impact information system comprising:
environmental impact information obtaining means for obtaining environmental impact information regarding an environmental impact at a plurality of processes included in activities of an organization;
environmental impact information collection means for collecting the environmental impact information obtained by said environmental impact information obtaining means;
environmental impact information analyzing means for analyzing the environmental impact information collected by said environmental impact information collection means, and obtaining a set of environmental impacts in a product's life cycle;
report information generation means for generating report information in a predetermined format, based on the environmental impact information collected by said environmental impact information collection means and information representing the set of environmental impacts obtained by said environmental impact information analyzing means; and
an environmental impact calculation unit which calculates an environmental conservation effect and an economical effect brought by an environmental measure taken in each of the plurality of processes.

9. An environmental impact information system including a plurality of process management devices for managing a plurality of processes included in activities of an organization and an environmental management device which are connected with each other through a predetermined network, and wherein:
each of said process management devices obtains environmental impact information regarding an environmental impact at each of the processes; and
said environmental management device includes:
an environmental impact information analyzer configured to collect the environmental impact information obtained by each of said process management devices through a network, and to obtain a set of environmental impacts in a product's life cycle based on the collected environmental impact information;
and an environmental impact calculation unit which calculates an environmental conservation effect and an economical effect brought by an environmental measure taken in each of the plurality of processes.

10. The environmental impact information system according to claim 9, wherein said process management device obtains information regarding chemical materials included in materials to be used for manufacturing products.

11. The environmental impact information system according to claim 9, wherein
said process management device measures an amount of used electricity, an amount of used fossil fuel, an amount of used water, an amount of used chemical materials, an exhaust amount of exhaust gas, and an exhaust amount of waste while products are manufactured.

12. The environmental impact information system according to claim 9, wherein
said process management device measures an amount of consumed fuel and an exhaust amount of exhaust gas while products are transported.

13. The environmental impact information system according to claim 9, wherein
said process management device measures information representing a status of each product.

14. The environmental impact information system according to claim 9, wherein
said process management device measures an amount of used electricity, an amount of used fossil fuel, an amount of used water, an amount of used chemical materials, an exhaust amount of exhaust gas, an exhaust amount of waste, and an amount of maintenance in a predetermined unit while maintenance is performed for products.

15. The environmental impact information system according to claim 9, wherein
said process management device measures information representing an amount of consumed fuel and an exhaust amount of exhaust gas while products are being collected and information representing a recycling status of the collected products.

16. An environmental impact information system, including a process management device for managing a plurality of processes included in activities of an organization and an environmental management device which are connected with each other through a predetermined network, and wherein:
said process management device includes environmental impact information obtaining means for obtaining environmental impact information regarding an environmental impact at each of the plurality of processes;
said environmental management device includes
an environmental impact information collection means for collecting the environmental impact information which is obtained by said environmental impact information obtaining means, and an environmental impact analyzing means for analyzing the environmental impact information collected by said environmental impact information collection means, and obtaining a set of environmental impacts in a product's life cycle; and report information generation means for generating report information in a predetermined format, based on the environmental impact information collected by said environmental impact information collection means and information representing the set of environmental impacts obtained by said environmental impact information analyzing means; and an environmental impact calculation means for calculating an environmental conservation effect and an economical effect brought by an environmental measure taken in each of the plurality of processes.

17. A method for providing environmental impact information, said method comprising the steps of:

obtaining environmental impact information regarding an environmental impact at each of a plurality of processes included in activities of an organization;

collecting the environmental impact information obtained at said obtaining step;

analyzing a set of environmental impacts in a product's life cycle, based on the environmental impact information collected at said collecting step;

providing information regarding the set of environmental impacts obtained at said analyzing step; and calculating an environmental conservation effect and an economical effect brought by an environmental measure taken in each of the plurality of processes.

18. A computer readable recording medium which records a program for controlling a computer to execute a method for providing environmental impact information, said method comprising the steps of:

obtaining environmental impact information regarding an environmental impact at each of a plurality of processes included in activities of an organization;

collecting the environmental impact information obtained at said obtaining step;

analyzing a set of environmental impacts in a product's life cycle, based on the environmental impact information collected at said collecting step;

providing information regarding the set of environmental impacts obtained at said analyzing step; and calculating an environmental conservation effect and an economical effect brought by an environmental measure taken in each of the plurality of processes.

19. A data signal embedded in a carrier wave and representing an instruction sequence for controlling a computer to execute a method for providing environmental impact information, said method comprising the steps of:

obtaining environmental impact information regarding an environmental impact at each of a plurality of processes included in activities of an organization;

collecting the environmental impact information obtained at said obtaining step;

analyzing a set of environmental impacts in a product's life cycle, based on the environmental impact information collected at said collecting step;

providing information regarding the set of environmental impacts obtained at said analyzing step; and calculating an environmental conservation effect and an economical effect brought by an environmental measure taken in each of the plurality of processes.

* * * * *